(12) United States Patent
Sittig et al.

(10) Patent No.: US 11,182,444 B2
(45) Date of Patent: Nov. 23, 2021

(54) COLLECTING AND PROVIDING CUSTOMIZED USER GENERATED CONTENT ACROSS NETWORKS BASED ON DOMAIN

(71) Applicant: Relola, Inc., Mountain View, CA (US)

(72) Inventors: Heather L. Sittig, Oakland, CA (US); Graham Golder, Fremont, CA (US)

(73) Assignee: Relola, Inc., Mountain View, CA (US)

( * ) Notice: Subject to any disclaimer, the term of this patent is extended or adjusted under 35 U.S.C. 154(b) by 774 days.

(21) Appl. No.: 15/788,651

(22) Filed: Oct. 19, 2017

(65) Prior Publication Data
US 2018/0107746 A1    Apr. 19, 2018

Related U.S. Application Data

(60) Provisional application No. 62/410,338, filed on Oct. 19, 2016.

(51) Int. Cl.
*G06F 16/00* (2019.01)
*G06F 16/9535* (2019.01)
(Continued)

(52) U.S. Cl.
CPC ........ *G06F 16/9535* (2019.01); *G06F 16/285* (2019.01); *G06F 16/955* (2019.01); *G06F 16/958* (2019.01); *G06F 16/9537* (2019.01)

(58) Field of Classification Search
CPC ...... G06F 16/951; G06F 21/31; G06F 3/0481; G06F 16/29; G06F 16/9535; G06F 40/174; G06F 40/58; G06F 16/532; G06F 16/5838; G06F 40/166; G06F 16/00; G06F 16/24; G06F 16/24578; G06F 16/50;
(Continued)

(56) References Cited

U.S. PATENT DOCUMENTS 6,684,196 B1 * 1/2004 Mini .................. G06Q 30/02
                                                     705/14.34
8,375,016 B2 * 2/2013 Allison ................. G06Q 50/16
                                                     707/705
(Continued)

OTHER PUBLICATIONS

International Application No. PCT/US2017/057452, International Search Report and Written Opinion dated Jan. 9, 2018.

*Primary Examiner* — Yicun Wu
(74) *Attorney, Agent, or Firm* — Ahmann Kloke LLP

(57) ABSTRACT

An example method comprises registering an account of a first user, receiving first and second requests to store user generated content and first and second user generated content by the first user, the first and second user generated content being associated with at least the first user, the first request including an uploading user identifier, one or more categorical identifiers, and a first domain identifier, associating the first user generated content with an account of the first user and the first domain identifier, associating the second user generated content with the second domain identifier, receiving, from a searching user at a domain, a search request including a search criteria and a third domain identifier, if the third domain identifier is associated with the first domain identifier, determining the first user generated content to provide to the searching user based on the search criteria, and providing the first user generated content.

19 Claims, 13 Drawing Sheets

(51) Int. Cl.
  *G06F 16/28*     (2019.01)
  *G06F 16/955*    (2019.01)
  *G06F 16/9537*   (2019.01)
  *G06F 16/958*    (2019.01)

(58) Field of Classification Search
  CPC ............ G06F 16/90324; G06F 16/957; G06F 16/9574; G06F 16/9577; G06F 16/972; G06F 21/57; G06F 21/62; G06F 3/023; G06F 3/038; G06F 3/04817; G06F 3/0484; G06F 40/134; G06F 40/14; G06F 40/186; G06F 40/20; G06F 40/247; G06F 40/263; G06F 7/06; G06F 9/451; G06F 9/454
  See application file for complete search history.

(56) References Cited

U.S. PATENT DOCUMENTS

| | | | |
|---|---|---|---|
| 8,433,650 B1* | 4/2013 | Thomas | G06Q 10/06 705/38 |
| 9,105,061 B2* | 8/2015 | Eraker | G06Q 30/00 |
| 10,459,967 B2* | 10/2019 | Croteau | G06F 3/0485 |
| 2012/0278128 A1* | 11/2012 | Danzan | G06Q 50/16 705/7.29 |
| 2015/0095782 A1 | 4/2015 | Avedissian | |
| 2016/0027051 A1* | 1/2016 | Gross | G06K 9/46 705/14.54 |
| 2017/0024836 A1 | 1/2017 | Jackson | |

* cited by examiner

COLLECTING AND PROVIDING CUSTOMIZED USER GENERATED CONTENT ACROSS NETWORKS BASED ON DOMAIN

The present application claims benefit of U.S. Provisional Patent Application No. 62/410,338, filed Oct. 19, 2016, and entitled "Real Estate Review Integration and Support for Third-Party Real Estate Partners" which is incorporated by reference herein.

FIELD OF THE INVENTION

Embodiments of the present invention related generally to customizing user generated content across networks based on the domain the user is accessing.

SUMMARY

An example method comprises registering, by a content delivery system, accounts for a plurality of users, authenticating, by the content delivery system, one or more of the plurality of users, receiving a first request to store user generated content and first user generated content by a first user of the plurality of users, the first user generated content being associated with at least the first user, the first request to store user generated content including an uploading user identifier, one or more first categorical identifiers associated with the first user generated content, and a first domain identifier, associating the first user generated content with an account of the first user, the uploading user identifier, the one or more first categorical identifiers, and the first domain identifier, storing, by the content delivery system, the first user generated content and associations, receiving a second request to store user generated content and second user generated content by the first user, the second user generated content being associated with at least one first user, the second request to store user generated content including an uploading user identifier, one or more second categorical identifiers associated with the second user generated content, and a second domain identifier, associating the second user generated content with the account of the first user, the uploading user identifier, the one or more second categorical identifiers, and the second domain identifier, storing, by the content delivery system, the second user generated content and associations, receiving, from a searching user at a web site associated with a domain, a search request, the search request including a search criteria including at least a third domain identifier, the third domain identifier being associated with the domain, if the third domain identifier is associated with the first domain identifier, determining all or a portion of the first user generated content to provide to the searching user based on the search criteria, and providing all or the portion of the first user generated content to the searching user, and if the third domain identifier is associated with the second domain identifier, determining all or a portion of the second user generated content to provide to the searching user based on the search criteria, and providing all or the portion of the first user generated content to the searching user.

In various embodiments, the first user generated content is associated with an object or activity. In some embodiments, the method further comprises wherein the first request to store user generated content includes a time stamp indicating when the first user generated content was uploaded, the time stamp being associated with the first user generated content, wherein determining all or the portion of the first user generated content to provide to the searching user based on the search criteria includes, at least in part, determining all or the portion of the first user generated content to provide to the searching user based on the search criteria that includes a timestamp search criteria that is compared to the timestamp, wherein the first user generated content is provided to the searching user if the timestamp search criteria is satisfied based on the timestamp associated with the first user generated content.

The method may further comprise wherein the first request to store user generated content includes a user identifier indicating the first user who uploaded the first user generated content, wherein determining all or the portion of the first user generated content to provide to the searching user based on the search criteria includes, at least in part, determining all or the portion of the first user generated content to provide to the searching user based on the search criteria that includes a user search criteria that is compared to the user identifier, wherein the first user generated content is provided to the searching user if the user search criteria is satisfied based on the user identifier associated with the first user generated content.

In some embodiments, the method may further comprise wherein the first request to store user generated content includes a location identifier indicating a location associated with the first user generated content, wherein determining all or the portion of the first user generated content to provide to the searching user based on the search criteria includes, at least in part, determining all or the portion of the first user generated content to provide to the searching user based on the search criteria that includes a location search criteria that is compared to the location identifier, wherein the first user generated content is provided to the searching user if the location search criteria is satisfied based on the location identifier associated with the first user generated content.

In various embodiments, the method may further comprise wherein the first request to store user generated content includes a tags indicating categorical information associated with the first user generated content, wherein determining all or the portion of the first user generated content to provide to the searching user based on the search criteria includes, at least in part, determining all or the portion of the first user generated content to provide to the searching user based on the search criteria that includes a tag search criteria that is compared to the first categorical identifiers associated with the first user generated content, wherein the first user generated content is provided to the searching user if the tag search criteria is satisfied based on the categorical identifiers associated with the first user generated content.

In some embodiments, the method may further comprise receiving an overlay request and location information, and providing an overlay based at least in part on the location information in response to the overlay request, the overlay request including at least one element associated with the at least a portion of the first user generated content. Further, the method may further comprise receiving an element interaction indicating a user has clicked on the at least one element and providing the at least a portion of the first user generated content.

The first user generated content may be in the form of one or more of text, audio, or video.

An example non-transitive computer readable medium may comprise executable instructions. The executable instructions may be executable by a processer for performing a method. The method may comprise registering, by a content delivery system, accounts for a plurality of users, authenticating, by the content delivery system, one or more of the plurality of users, receiving a first request to store user generated content and first user generated content by a first user of the plurality of users, the first user generated content being associated with at least the first user, the first request to store user generated content including an uploading user identifier, one or more first categorical identifiers associated with the first user generated content, and a first domain identifier, associating the first user generated content with an account of the first user, the uploading user identifier, the one or more first categorical identifiers, and the first domain identifier, storing, by the content delivery system, the first user generated content and associations, receiving a second request to store user generated content and second user generated content by the first user, the second user generated content being associated with at least one first user, the second request to store user generated content including an uploading user identifier, one or more second categorical identifiers associated with the second user generated content, and a second domain identifier, associating the second user generated content with the account of the first user, the uploading user identifier, the one or more second categorical identifiers, and the second domain identifier, storing, by the content delivery system, the second user generated content and associations, receiving, from a searching user at a web site associated with a domain, a search request, the search request including a search criteria including at least a third domain identifier, the third domain identifier being associated with the domain, if the third domain identifier is associated with the first domain identifier, determining all or a portion of the first user generated content to provide to the searching user based on the search criteria, and providing all or the portion of the first user generated content to the searching user, and if the third domain identifier is associated with the second domain identifier, determining all or a portion of the second user generated content to provide to the searching user based on the search criteria, and providing all or the portion of the first user generated content to the searching user.

An example system may comprise one or more processors and memory. The memory may include instructions to configure the one or more processors to register, by a content delivery system, accounts for a plurality of users, authenticate, by the content delivery system, one or more of the plurality of users, receive a first request to store user generated content and first user generated content by a first user of the plurality of users, the first user generated content being associated with at least the first user, the first request to store user generated content including an uploading user identifier, one or more first categorical identifiers associated with the first user generated content, and a first domain identifier, associate the first user generated content with an account of the first user, the uploading user identifier, the one or more first categorical identifiers, and the first domain identifier, store, by the content delivery system, the first user generated content and associations, receive a second request to store user generated content and second user generated content by the first user, the second user generated content being associated with at least one first user, the second request to store user generated content including an uploading user identifier, one or more second categorical identifiers associated with the second user generated content, and a second domain identifier, associate the second user generated content with the account of the first user, the uploading user identifier, the one or more second categorical identifiers, and the second domain identifier, store, by the content delivery system, the second user generated content and associations, receive, from a searching user at a web site associated with a domain, a search request, the search request including a search criteria including at least a third domain identifier, the third domain identifier being associated with the domain, if the third domain identifier is associated with the first domain identifier, determine all or a portion of the first user generated content to provide to the searching user based on the search criteria, and provide all or the portion of the first user generated content to the searching user, and if the third domain identifier is associated with the second domain identifier, determine all or a portion of the second user generated content to provide to the searching user based on the search criteria, and provide all or the portion of the first user generated content to the searching user.

DETAILED DESCRIPTION

Figure 1:
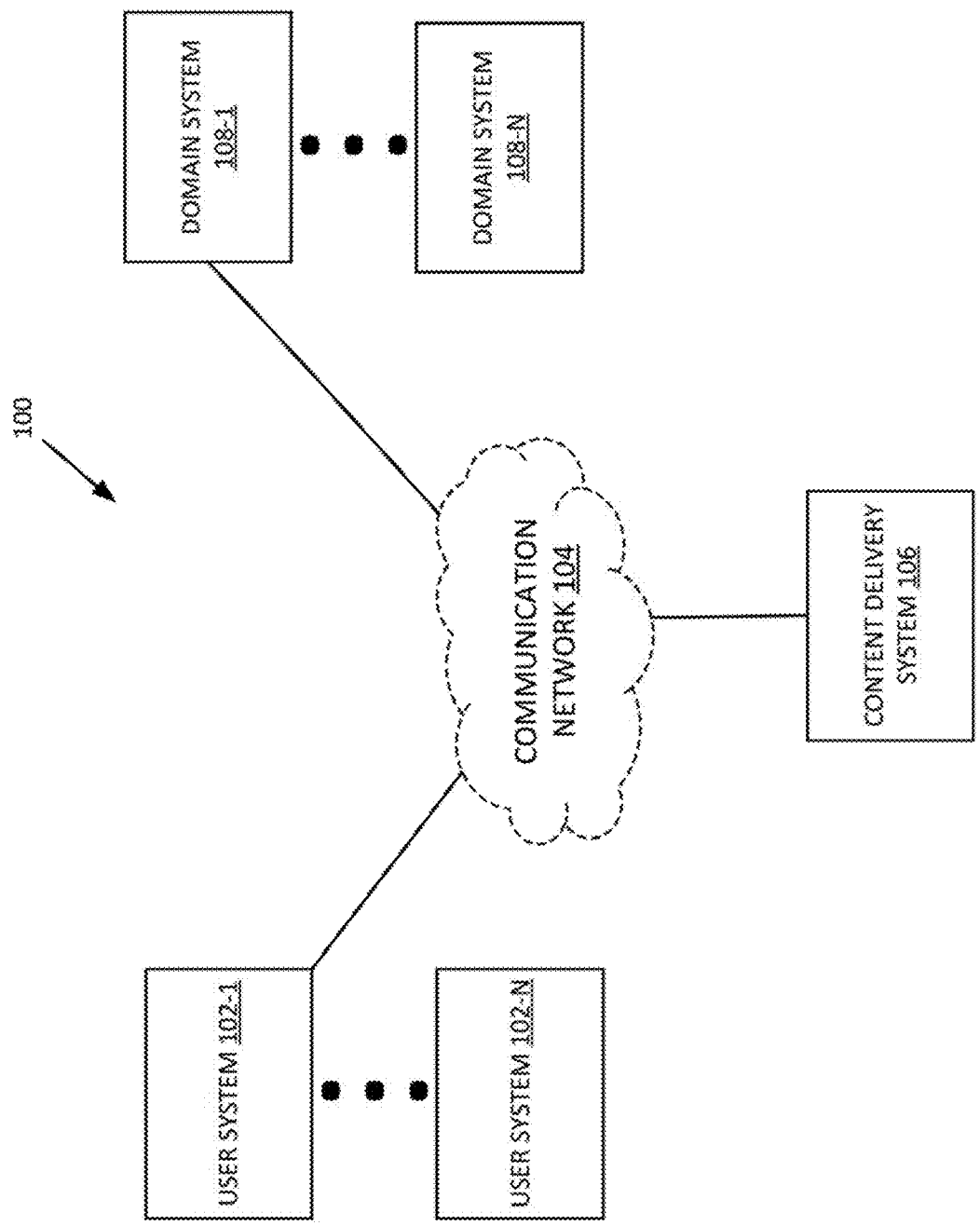
FIG. 1 depicts a block diagram of an example environment 100 capable of collecting and providing customized user generated content to any number of digital devices over any number of networks 104.

Different websites and/or different applications may retrieve and store content to a centralized system that manages, stores, and retrieves the content based on the requesting domain (e.g., the specific requesting website or application) and/or the criteria of the request (e.g., the user making the request, timeline, location, and/or other information). As a result, a centralized system, such as a content delivery system, may provide content to multiple different web pages and applications. The different web pages and applications may present content from the content delivery system as if the content was being provided by the entity that owns or operates the web pages or applications.

In some embodiments, a website provides or otherwise generates a web page with a section of embedded code. The embedded code, initially provided by a content delivery system, may generate a section (e.g., a portion) of the web page. The section of the web page may be integrated into the web page such that the entire web page, including content from the generated section, appears to be from the same source. The embedded code, however, may provide a request for content from the content delivery system while the rest of the content of the web page is provided by an owner or operator of the web page. The request for content may include, for example, a domain identifier associated with the web site, web page, owner, and/or operator. The content delivery system may retrieve content based on the domain identifier and provide the content back to the requesting web page for display as a part of the web page.

It will be appreciated that the content delivery system may provide different content to a variety of different web pages, web sites, and/or applications based on domain identifiers. In some embodiments, the content delivery system may further provide content based on tags, content creator, time of creation, and/or other criteria in addition to the domain identifier. The content delivery system may provide different content to a wide variety of different web pages, web sites, and/or applications thereby enabling different web pages, web sites, and/or applications to rely on centralized content provided by the content delivery system without recreating the content and/or embedded code at each web page, web site, and/or application.

Each web page, web site, and/or application may display or assist in displaying a user interface that includes the content from the content delivery system. In various embodiments, the content displayed in the user interface may appear to be a part of the web page, web site, or application (e.g., from the owner or operator of the web page, web site, or application). It will be appreciated that the content delivery system may enable the delivery of content such that it appears to be coming from the web page, web site, or application thereby keeping customers and/or viewers of the user interface to be engaged with the original domain (e.g., the web page, web site, or application).

Further, it will be appreciated that the content delivery system may receive content from different creators, the content from different creators may be provided to a group of different web pages, web sites, and/or applications. As a result, centralized content generated from one or more members may be leveraged to different sites. In some embodiments, a content creator may enable their content to be stored in the content delivery system and may further make selections to enable their content to be provided to a group of subset of web pages, web sites, and/or applications such that their content appears to be a part of the web page, web site, or application (e.g., from the owner or operator of the web page, web site, or application).

In one example, a real estate web page of a real estate company may provide a user interface depicting different properties. The real estate web page may include a first embedded code that retrieves a map of a location from a third-party map provider (e.g., Google Maps, Mapquest, or the like). The embedded code may also provide a content request to a content delivery system. The content request may include a domain identifier that identifies the domain (e.g., real estate web page and/or real estate company). The content delivery system may receive the content request and, based at least in part on the domain identifier, retrieve content. In one example, the content delivery system may retrieve content based on the domain identifier and location identifiers (e.g., coordinates or other location information) associated with the map. The content delivery system may deliver the retrieved content to the real estate web page and/or a user's digital device.

The user interface depicted to the user may include the real estate web page along with an integrated section of the web page depicting the map from the third-party map provider as well as the content from the content delivery system. In some embodiments, the content from the content delivery system may be overlayed over the map and may depict places of interest as well as text or other indications of the places of interest (e.g., labeled dots, flags, pins, and/or the like).

The user may interact (e.g., click) on a place of interest in the map thereby generating a content interaction request. The content interaction request may include an interaction identifier which identifies or otherwise indicates the place of interest. The interaction identifier may also, in some embodiments, indicate the domain identifier, user identifier identifying the user that interacted with the place of interest, location information, or other tags provided by the web page and/or the user. Based on the interaction identifier, the content delivery system may provide additional content associated with the place of interest back to the requesting real estate web page thereby enabling a user to interact with the real estate web page and receive content without appearing to leave the domain. It will be appreciated that the interaction opportunities (e.g., additional links or other interactive icons) may be provided and the process may continue.

In another example, a birding web page identifying or including discussion of birds of interest from a wildlife group may provide a user interface depicting discussion of birding. The birding web page may include a second embedded code that also retrieves a map of a location from a third-party map provider (e.g., Google Maps, Mapquest, or the like). The embedded code may also provide a content request to the same content delivery system that provided content to the real estate web page. The content request may include a domain identifier that identifies the domain (e.g., birding web page and/or wild life group). The content delivery system may receive the content request and, based at least in part on the domain identifier, retrieve content. In one example, the content delivery system may retrieve content based on the domain identifier and location identifiers (e.g., coordinates or other location information) associated with the map. The content delivery system may deliver the retrieved content to the birding web page and/or a user's digital device.

The user interface depicted to the user may include the birding web page along with an integrated section of the web page depicting the map from the third-party map provider as well as the content from the content delivery system. In some embodiments, the content from the content delivery system may be overlayed over the map and may depict places of interest as well as text or other indications of the places of interest (e.g., labeled dots, flags, pins, and/or the like). The places of interest may be, in this example, locations of bird of interest.

The user may interact (e.g., click) on a place of interest in the map thereby generating a content interaction request. The content interaction request may include an interaction identifier which identifies or otherwise indicates the place of interest. The interaction identifier may also, in some embodiments, indicate the domain identifier, user identifier identifying the user that interacted with the place of interest, location information, or other tags provided by the web page and/or the user. Based on the interaction identifier, the content delivery system may provide additional content associated with the place of interest back to the requesting birding web page thereby enabling a user to interact with the birding web page and receive content without appearing to leave the domain. It will be appreciated that the interaction opportunities (e.g., additional links or other interactive icons) may be provided and the process may continue.

There may be any number of web pages of different web sites that utilize content from the content delivery system. In some embodiments, users themselves may create and store content with the content delivery system. The users may store content at the content delivery system through another party's web page (e.g., the real estate web page or the birding web page), application, or at the content delivery system without going through another entity's web page or another entity's application. The user may select those groups and/or individuals that are able to retrieve and/or view their content. As a result content of a variety of different categories and different type may be stored at the content delivery system and that content may be provided to others depending on the requesting domain, creator, categories, and/or any other information.

It will be appreciated that content may include any kind of digital content or media, including, but not limited to pictures, text, video, sound, graphics, icons, interactive programming, or any combination of the above.

FIG. 1 depicts a block diagram of an example environment 100 capable of collecting and providing customized user generated content to any number of digital devices over any number of networks 104. In this example, the environment 100 includes user systems 102-1 to 102-N (individually, user system 102 collectively), communication network 104, content delivery system 106, and domain systems 108-1 to 108-N (individually, domain system 108 collectively). The user systems 102-1 to 102-N, content delivery system 106, and domain systems 108-1 to 108-N may each be or include any number of digital devices. A digital device is any device with a processor and memory. Digital devices are further discussed herein (e.g., see FIG. 11).

In some embodiments, user system 102-1 may be configured to facilitate communication between users and other associated systems. In some embodiments, the user system 102-1 may be or include one or more mobile devices (e.g., smartphones, cell phones, smartwatches, table computer, or the like), desktop computers, laptop computers, and/or the like.

In some embodiments, communication network 104 represents one or more computer networks (e.g., LAN, WAN, or the like). Communication network 104 may provide communication between any of user system 120, content delivery system 106 and domain system 108. In some implementations, communication network 104 comprises computer devices, routers, cables, uses, and/or other network topologies. In some embodiments, communication network 104 may be wired and/or wireless. In various embodiments, communication network 104 may comprise the Internet, one or more networks that may be public, private, IP-based, non-IP based, and so forth.

In some embodiments, users may interact with user system 102-1-102-N using, for example, a web browser or mobile application to communication with other users, access web pages on the domain system 108-1, and/or interact with applications on their own devices to generate or receive user generated content from the content delivery system 106.

In various embodiments, content may be selected to be provided to a user system 102-1 based on a domain a user is accessing. The domain may indicate a web site being accessed by the user, a web server hosting the web site, the operator of the web site, or owner of the web site. In one example, if a user is accessing a Century 21 website on domain system 108-1 to investigate real estate, a web page of the Century 21 website may provide a request for content to the content delivery system (e.g., content delivery system 106). The request for content may identify the domain (e.g., Century 21 and/or a web page of the Century 21 web site). The content delivery system 106 may provide content from a content data store (discussed herein) utilizing, at least in part, the Century 21 domain identifier.

It will be appreciated that content delivery system 106 may provide different content to a wide variety of different web pages, web sites and/or applications thereby enabling different web pages, web sites and/or applications to reply on centralized content provided by the content delivery system without recreating the content and/or embedded code at each web page, web site and/or application.

In some embodiments, the content delivery system 106 collects user generated content created by any number of users (e.g., user systems 102-1-102-N) of an object (e.g., location, facility, landmark, or the like) or activity. The user generated content may be associated with one or more categories (e.g., using tags) with relation to (or in interest of) domain system 108 (e.g., domain system 108 may be a real estate listing domain, and the object may be a listing of a real estate property that is for sale).

The user of user system 102, may create an account on the content delivery system 106. The user may upload content to the content delivery system 106. The content may be linked or associated with the user (e.g., a user ID), time at which the content was uploaded (e.g., by timestamp), tags identifying categories, domains (e.g., websites, web pages, applications, an operator of a website or application, and/or an owner of the website or application), location information (e.g., map locations or coordinates), and/or the like. In one example, a user of user system 102-1, such as a real estate agent, could create a review of a listing of a home in which he/she recently visited. The created listing could be shared publicly or privately (e.g., with a small number of interested potential buyers). In various embodiments, the real estate agent in the above example may include content indicating impressions or facts regarding homes, schools in the area of a listed property, stores, neighborhoods, and the like.

The content delivery system 106 may include content from any number of users. Any of the content may be associated with any number of user identifiers, time at which that particular content was uploaded, tags, domains, location information, and/or the like. Any number of websites or applications may request information from the content delivery system 106 and, based on the criteria (e.g., domain of the website), the content delivery system 106 may select and/or filter any amount of previously stored user generated content and provide the content back to the requesting website or application.

As a result the content delivery system 106 may provide different types of information provided by any number of users to any number of web pages and applications. It will be appreciated that, in some embodiments, the same user may provide a request for content from the content delivery system 106 from multiple different websites. If the domain of the different websites is different, different content may be provided based in part on the domain of the different websites.

In some embodiments, content delivery system 106 provides one or more datastores for a plurality of users across a plurality of domains. A particular user, who has registered to a particular website, such as Century 21 may be able to create or retrieve user generated content on the particular domain content datastore that is associated with the particular website. A user may have access to multiple datastores across a plurality of domains, for example, a real estate agent may be registered to have access to the datastore associated with his real estate agency (e.g., Century 21), and a bird watching society (e.g., National Audubon Society). That particular user may provide search queries of user generated content at both domain content datastores (discussed herein). In other embodiments, the user is only able to do search queries of user generated content on one domain content datastore at a time.

In some embodiments, domain system 108 is a website, a system that provides content to a website, a web page, and/or a system that provides support for an application. In various embodiments, the domain system 108 may be configured to host websites and provide an integrated domain dependent section which allow user system 102 to access data from a variety of third party domains and seamlessly blend them into the display of the domain system. An example of an integrated domain dependent section can be found in FIG. 6. In one example of an integrated domain dependent section is a portion of a web page or interface of an application that appears to be a part of the original domain as the rest of the web page or interface (e.g., a real estate web page may include an integrated domain dependent section that appears to be from the real estate web page). The integrated domain dependent section may, however, include links for content from the content delivery system 106 and/or include content from the content delivery system 106. As a result, different web pages with different integrated domain dependent sections may each request and include content from the content delivery system 106, the display of content from the content delivery system 106 in the integrated domain dependent section may appear to be coming from the domain itself.

Businesses will appreciate the value of being able to request and retrieve content without a user of a browser being directed to another web page and/or without the user being given the impression that important information is not being provided by the provider of the web page. For example, different Century 21 web pages may be enabled to retrieve and display content from the content delivery system 106 on the different web pages without directing the user to another web site controlled by another (thereby potentially breaking engagement with the Century 21 web site). Similarly other web sites (e.g., Yelp, Google reviews, local neighborhood web pages, Boy Scout web pages, and the like) may each include integrated domain dependent sections that request and receive content from the content delivery system 106 and, as a result, each may display content as if the content was from the particularly web site (and not from another server, provider, system, or entity).

Although discussion included herein may discuss web pages or application interfaces without reference to the other, it will be appreciated that systems and methods described herein may apply to applications, application interfaces, web pages, and web sites.

Although only one content delivery system 106 and communication network 104 is depicted in FIG. 4, it will be appreciated that there may be any number of content delivery systems 106 and any number of communication networks 104.

In various embodiments, one or more domain systems 108-1-108-N may include portions of web pages with links to the content delivery system 106. When a link is activated, an action request (not necessarily a request for user generated content) may be provided to the content delivery system 106. The action request may include a domain identifier identifying the web site of the web page or the web page. In various embodiments, the content delivery system 106 may determine functionality of the action request based in part on the domain identifier. For example, the content delivery system 106 may include a policy for each domain system 108-1 (e.g., a policy for each web site owner, for each web site operator, for any number of web pages, for any number of applications, for each application owner, or for each application operator). The policy may include rules for each domain. The rules may indicate which action to take based on the requesting link and/or the domain identifier of the action request.

In some embodiments, the content delivery system 106 may receive an action request, retrieve a policy associated with a domain based on the domain identifier of the action request, and take action based on the policy and/or a link identifier. For example, the content delivery system 106 may provide information (e.g., links, content, video, audio, or the like) from its own data store, from the domain system 108-1, another domain system, or any other data source. The requesting domain system 108-1 may then display that information as if the information or action was taken by the domain system 108-1 itself. As a result, the content delivery system 106 may provide content and actions for any number of web sites, web pages, applications, and/or the like operated and/or owned by different entities.

Figure 2:
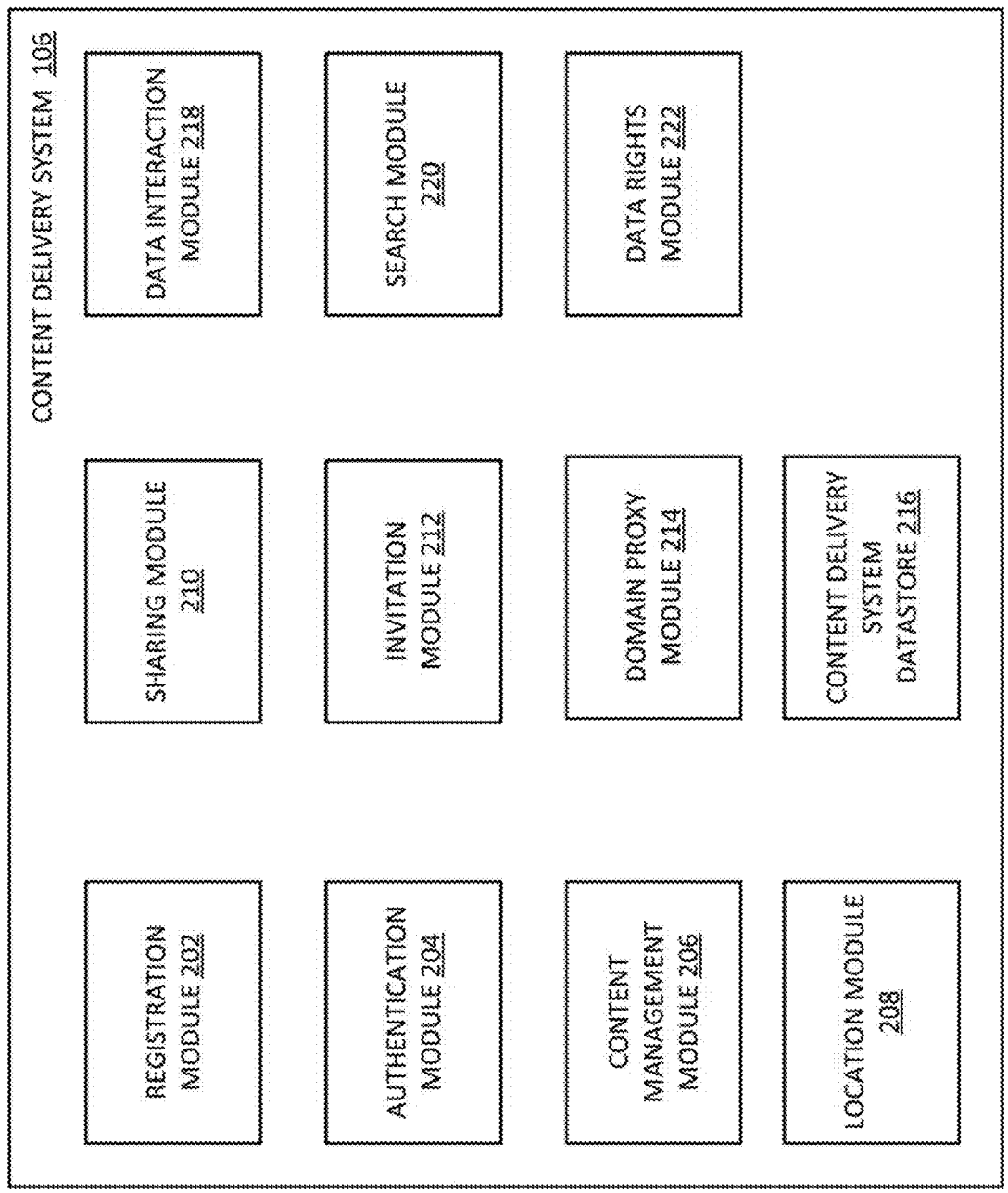
FIG. 2 depicts a block diagram of an example of a content delivery system according to some embodiments.

FIG. 2 depicts a block diagram of an example of a content delivery system 106 according to some embodiments. Content delivery system 106 includes a registration module 202, authentication module 204, content management module 206, location module 208, sharing module 210, invitation module 212, domain proxy module 214, content delivery system datastore 216, data interaction module 218, search module 220 and data rights module 222.

In some embodiments, registration module 202 may be configured to create accounts for users and user groups. The registration module 202 may be configured to update account information for users and user groups. When a new user registers, a user identifier (e.g., a login identifier) and password may be required.

In various embodiments, accounts for users may include identification information (e.g., email address, password, phone number, demographic information, and the like). Accounts for user groups may include the account information for users who belong to the user group and, optionally, a level of permission (e.g., for content retrieval) associated to one or more user. In some embodiments registration may be required in order to create and store user generated content associated with an object or activity with the content delivery system datastore 216. In various embodiments, a user may be required to be registered and/or login to their account before storing content with the content delivery system 106 and/or retrieving content from the content delivery system 106.

In various embodiments, the registration module 202 may create a user account for each user or user group. The account may be stored with the content delivery system 106 (e.g., with the content delivery system datastore 216).

The authentication module 204 may be configured to authenticate a user's login and password. The login and password may be associated with the user's account. Authentication module 204 may authentic a user by comparing the user's login and password with a database of registered users. It will be appreciated that users maybe authenticated in many ways including, but not limited to, device identifiers, biometrics, encryption keys, cookies, and/or the like. In some embodiments, authentication module 204 may, after authentication, determine data permissions prior to allowing users to access to content within the content delivery system datastore 216.

In some embodiments, the content management module 206 may be configured to manage (e.g., create, read, update, delete, provide and/or otherwise access) user generated content. In one example, user generated content may be associated with an object or activity and stored in the content delivery system datastore 216. The content management module 206 may categorize or associate user generated content with location information (such as global positioning system, GPS, coordinates) generated by the location module 208, security permission of a user, and/or links to other social networking websites such as Facebook®, Twitter®, and others. In some embodiments, content management module 206 comprises a library of executable instructions which are executable by a processor for performing one or more of the aforementioned management operations.

The location module 208 may be configured to determine or receive geographic location (e.g., location information) regarding an object or activity associated with user generated content. As discussed herein, in some embodiments, user generated content may be associated with an object or activity as well as geographic location information (e.g., the user generated content may include restaurant reviews in a city and may be associated with GPS or address information). It will be appreciated that the location module 208 may also determine or receive geographic location information regarding a cluster of objects or activities located in a similar area and/or a cluster of objects or activities with some common categorical identifier. For example, location information may be used by a potential real estate buyer to determine real estate properties close to a particular school, or for an avid bird watcher to locate new bird sightings close to their home. In some embodiments, location module 208 may utilize or receive GPS information, Wi-Fi signals, and/or cellular signals to determine or assist in determining location information associated with new user content to be stored or user content to be retrieved.

The sharing module 210 may be configured to receive permissions and enable users to share user generated content in an electronical mail (email) or social networking website such as Facebook®, Twitter®. In various embodiments, the sharing module 210 may also provide push notification to other users when they are associated with a user that has stored new user contents.

It will be appreciated that users may generate user content and store the user content in the content delivery system datastore. The user may invite other users or groups of users to access their content using the sharing module 210. For example, the user may provide user identifiers to invite others to receive or be able to view the user's content. The sharing module 210 may retrieve user address information (e.g., email addresses, chat addresses, instant message addresses, or the like) from each user's account. In some embodiments, the user may provide the sharing module 210 address information without the sharing module 210 retrieving the address information.

In various embodiments, the sharing module 210 may be configured by a user to enable social networks to receive any content generated by the user and/or may be configured to retrieve any content from the social networks (e.g., from the user's Pinterest site) to be stored in the content delivery system datastore 216.

Sharing module 210 may communication with content management module 206, data rights module 222, data interaction module 218, content delivery system datastore 216 and others to determine the security and permission settings of a given user generated content before it can be shared on any social networking websites.

In some embodiments, the invitation module 212 may provide invitations to others to receive or otherwise access content of the user. The invitees may respond by proving an invitation acceptance to the content delivery system 106. If an invitation is accepted, the invitation module 212 may generate a data right associated with the content creator and the invitee to enable the invitee to receive and/or access content from the content creator (e.g., the user generated content from the content creator stored in the content delivery system datastore 210). In some embodiments, user generated content may not be available to those who are not specifically approved by the user to receive or access their content unless marked as "public" for all users (in which case the data rights for such content may indicate that the content is available to all).

In some embodiments, invitation module 212 may be configured to invite users to view or create user generated content associated with a particular object or activity, or a cluster of objects or activities, or a cluster of objects or activities with a common categorical identifier. Invited users may or may not be registered as a user or as a part of a user group. For example, an avid bird watcher who belongs to a National Audubon Society may wish to invite fellow bird watchers, who may not may not be registered with the Audubon society, to share user generated content, such as a sighting of a rare bird.

The domain proxy module 214 may enable websites, web pages, applications, or the like to store content on the content delivery system 106 and/or retrieve content from the content delivery system 106 on one or more user's behalf. For example, a group of users may be registered at a web site. When a user wishes to store content, the user may engage with a web page of the website to upload or create the content. The web page or functionality which is triggered by the web page may provide login information and a password of the user or on the user's behalf as the user's proxy. In this example, the website may provide a proxy login request including a login and password that is associated with the user (e.g., the user's login and password, or a group associated with the user which may have an account on the content delivery system 106) to the content delivery system 106. The content delivery system 106 may authenticate the login and password. If the login and password is authenticated, the web page may then provide the content to the content delivery system 106 along with information associated with the content (e.g., user identifier, domain identifier, location information, tags, time of creation, and/or the like). The content delivery system 106 may store the content associated with the information.

Alternately, in some embodiments, the domain proxy module 214 may enable the content delivery system 106 to provide content to the web page. For example, the domain proxy module 214 may provide login information and a password of the user, on the user's behalf as the user's proxy, and/or as a group login or password for a group that the user is a part. The web page may also provide a content request including information to assist with retrieval of the desired content (e.g., a domain identifier, creator information, requesting user information, timestamp information, location information, tags, or any combination of the above). If authenticated, the content delivery system 106 may retrieve the content based on the information in the content request and provide the content to the requesting web page.

The content delivery system datastore 216 may be any structure and/or structures suitable for storing data entries or records (e.g., an active database, a relational database, a self-referential database, a table, a matrix, an array, a flat file, a documented-oriented storage system, a non-relational NoSQL system, an FTS-management system such as Lucene/Solar, and the like). Content delivery system datastore 216 may store content, a plurality of domain content datastores, user generated content created or retrieved from different domains, user accounts, and/or the like. In some embodiments, content may be saved to or retrieved from different datastores of the content delivery system datastore 216 according to the domain that the user is currently accessing. In addition to user generated content, categorical identifiers may also be saved in content delivery system datastore 216 to facilitate the retrieval of the data at a later date. Categorical identifiers may include domain identification, user identification, geographical location of object or activity associated with the user generated content, time stamp of the user generated content, tags and others.

The data interaction module 218 may be configured to process content interaction requests which may occur when a user interacts (e.g., click) on an embedded element (e.g., link) within a web page, web site and/or application. For example, a real estate web page of a real estate company may provide a user interface depicting different properties. The real estate webpage may include embedded code that retrieves a map, provided by a third party mapping service, of a location. The map, in some embodiments, may be an integrated domain dependent section (e.g., see FIG. 6). The real estate webpage may retrieve overlay information from the content delivery system 106 to provide over the map (e.g., balls, flags, or other indications of additional content associated with different locations depicted in the map). For example, embedded code within the web page may provide a request for overlay information, a domain identifier, and/or location information to the content delivery system 106. The content delivery system 106 may then provide an overlay to a user device and/or the requesting web page for the overlay to be displayed over the map.

In various embodiments, if the user interacts with one or more elements (e.g., balls, pins, flags, or the like) of the overlay, the embedded code of the web page may provide a content request including an identifier associated with the element that the user selected. The content request may, in some embodiments, include a domain identifier and/or any other information. The data interaction module 218 may retrieve content associated with the selected element and provide the retrieved content to the web page and/or requesting user device.

In another example, when a user clicks on an embedded code may provide a content interaction request to data interaction module 218. Data interaction module 218 may facilitate the content interaction request by determining the interaction identifier and sending the information to content delivery system datastore 216. In other embodiments, data interaction module 218 may facilitate the content interaction request by sending an interaction identifier, such as the user identification and domain identification to data rights module 222 to verify that the user has permission to view the requested content. In various embodiments, before providing the overlay, the content delivery system 106 may confirm that the requesting user and/or web page has rights to the content associated with elements of the overlay thereby preventing a user from interacting with and/or viewing elements over a map that are associated with content that they do not have rights to view.

In some embodiments, search module 220 is configured to receive a content request and/or create a search query based on one or more search criteria. The search criteria may be based, at least in part, with information provided in the search request. For example, based on the domain that the user is currently accessing, or the user group that the user belongs to, the search module 220 may search a particular domain content datastore 302. The search module 220 may be configured to filter and organize according to one or more filter criteria, including the categorical identifiers, which may include tags, time stamp of the user generated content, geographical location, user identification and others. Other filtering criteria could include, but are not limited to, name of object or activity, time activity occurred or keywords.

In some embodiments, data rights module 222 is configured to determine if the user has permission (or rights) to view and/or edit content interaction request data. Even though a user has previously registered and authenticated as a registered user on a particular domain, data rights module 222 reviews the permissions of content interaction request data, since some data on a domain may require additional security before view and/or update. In various embodiments, the data rights module 222 may retrieve permissions and data rights from a user's account or a group account associated with the user and compare the permissions and/or data rights with any rules regarding viewing or accessing specific content in order to confirm that the user has sufficient permissions and/or data rights and enable the user to view or access the content or, if the user does not have sufficient permissions and/or data rights, block the user from viewing or accessing the content.

A module may be hardware or software. In some embodiments, the module may configure one or more processors to perform functions associated with the module. Although different modules are discussed herein, it will be appreciated that the content delivery system 106 may include any number of modules performing any or all functionality discussed herein.

In various embodiments, the content delivery system 106 may also contain a policy module configured to create at least one policy associated with one or more domains and a rules module configured to create and store rules for actions associated with interactive elements. As discussed herein, one or more domain systems 108-1-108-N may include portions of web pages with links to the content delivery system 106. When a link is activated, an action request (not necessarily a request for user generated content) may be provided to the content delivery system 106. The action request may include a domain identifier identifying the web site of the web page or the web page. In various embodiments, the content delivery system 106 may determine functionality of the action request based in part on the domain identifier.

In this example, the policy module of the content delivery system 106 may include a policy for each domain system 108-1 (e.g., a policy for each web site owner, for each web site operator, for any number of web pages, for any number of applications, for each application owner, or for each application operator). The policy may include rules or be utilized by the rules module to select rules. The rules may indicate which action to take based on the requesting link and/or the domain identifier of the action request.

In some embodiments, the content delivery system 106 may receive an action request, retrieve a policy associated with a domain based on the domain identifier of the action request, and take action based on the policy and/or a link identifier. For example, the content delivery system 106 may provide information (e.g., links, content, video, audio, or the like) from its own data store, from the domain system 108-1, another domain system, or any other data source. The requesting domain system 108-1 may then display that information as if the information or action was taken by the domain system 108-1 itself. As a result, the content delivery system 106 may provide content and actions for any number of web sites, web pages, applications, and/or the like operated and/or owned by different entities.

In one example, embedded code (e.g., provided by the content delivery system 106) may be embedded in a web page and/or application interface. The embedded code may generate an integrated section of the web page and/or application interface such that the section appears to be generated by the owner or operator (e.g., within the domain of) the web page and/or application interface.

In one example, the embedded code on a real estate web page may provide a collection of crowd-sourced reviews which may be stored on the web site associated with the real estate web page, partners of the real estate web page, and/or content delivery system 106.

In one example, the integrated section may retrieve activity information for real estate agents at a brokerage. In one example, the embedded code may display N insights at a time. These insights may be drawn from all recent insights created at the brokerage. The list of insights may rotate at a first specific time interval. At a second time interval, the list of recent insights may be refreshed with new insights. In this example, the embedded code may retrieve some of the insights, pictures, media or the like from the web site hosting the web page (or a third party site associated with the web site) and/or may provide a request for content to the policy module of the content delivery system 106. The request for content may include a domain identifier. The policy module may retrieve a policy associated with the domain identifier and determine the appropriate action (e.g., retrieve agent listings from the content delivery system 106 and/or other information from the requesting web site) and provide the information to be displayed within the integrated section. The information may be depicted in the integrated section as if the content was generated by the web site or the web server.

Examples of actions that may be taken may include, but are not limited to:
1. Mousing over dots indicated in the section of the web page (e.g., the section depicting a map) may produce popup box.
2. Active listings have function to see all photos in the popup box.
3. Sold listings may depict a photo.
4. Sold listings display the word SOLD over the photo
5. Map opacity is 50%
6. Map zoom scales to breadth of users' pins (e.g., elements associated with user selections over the map).
7. Popup box may float outside of map when hovering over a pin near the edges
8. If pin is far to the left or right, pointer on popup box may rotate to side
9. Clicking on the pin or the popup box takes the user to an individual insight (e.g., user content of information associated with the user's thoughts associated with an object or location associated with the pin).
10. Green pins may be populated by information we gain from brokerages.
11. "Listings I've Visited" may indicate listings they've written insights for . . . not just checked into via the app.

It will be appreciated that actions may include any number of actions, and are not limited to the context or domain of real estate.

It will be appreciated that the policy module and rules module may provide similar or different content to embedded code in any number of web pages, web sites, and application interfaces thereby allowing the content delivery system 106 to be an information clearinghouse capable of providing needed information from any source without the user navigating away from the original web page, web site, or application interface (or breaking the user's understanding that they are still at the original web page, web site, or application interface).

Figure 3:
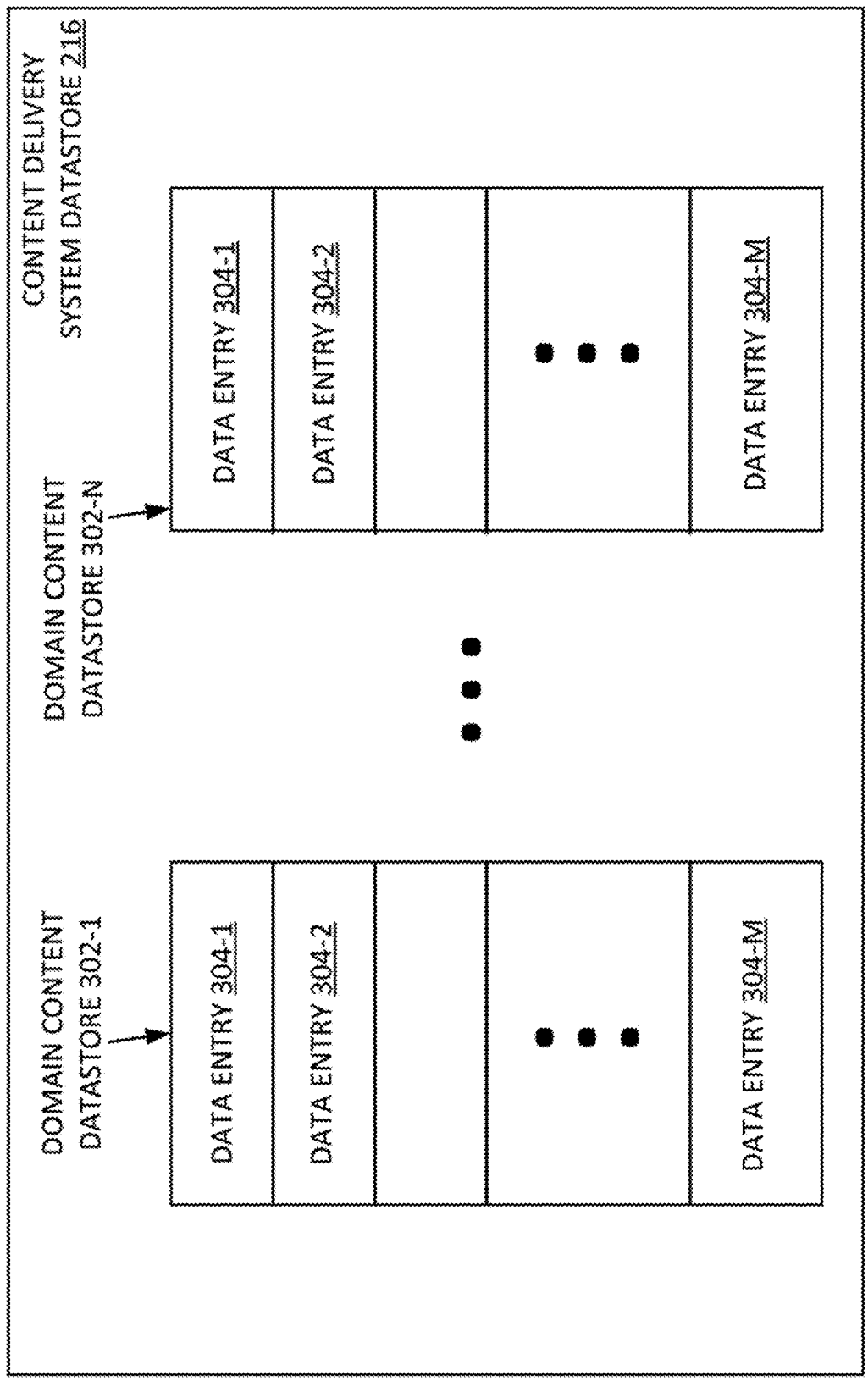
FIG. 3 depicts a block diagram of an example of a content delivery system datastore according to some embodiments.

FIG. 3 depicts a block diagram of an example of a content delivery system datastore 216 according to some embodiments. Content delivery system datastore 216 may be configured to store data entries, which contain user generated content, from a plurality of users, across different domains. The content delivery system datastore 216 comprises domain content datastores 302-1 to 302-N (individually, content delivery system datastore 302 collectively). Each domain content datastore 302, in turn, may include a plurality of data entries 304-1 to 304-M (individually, data entry 304 collectively). Each data entry, in addition to containing the user generated content also, may also include categorical identifiers such as domain identification, user identification, geographical location of object or activity associated with the user generated content, time stamp of the user generated content, tags, and/or others. In some embodiments, each data entry also includes view/update permissions, which comprises a list of users who have permission to view and/or update the user generated content. In some embodiments, user generated content is in the form of one or more of text, audio, and/or video.

Figure 4A:
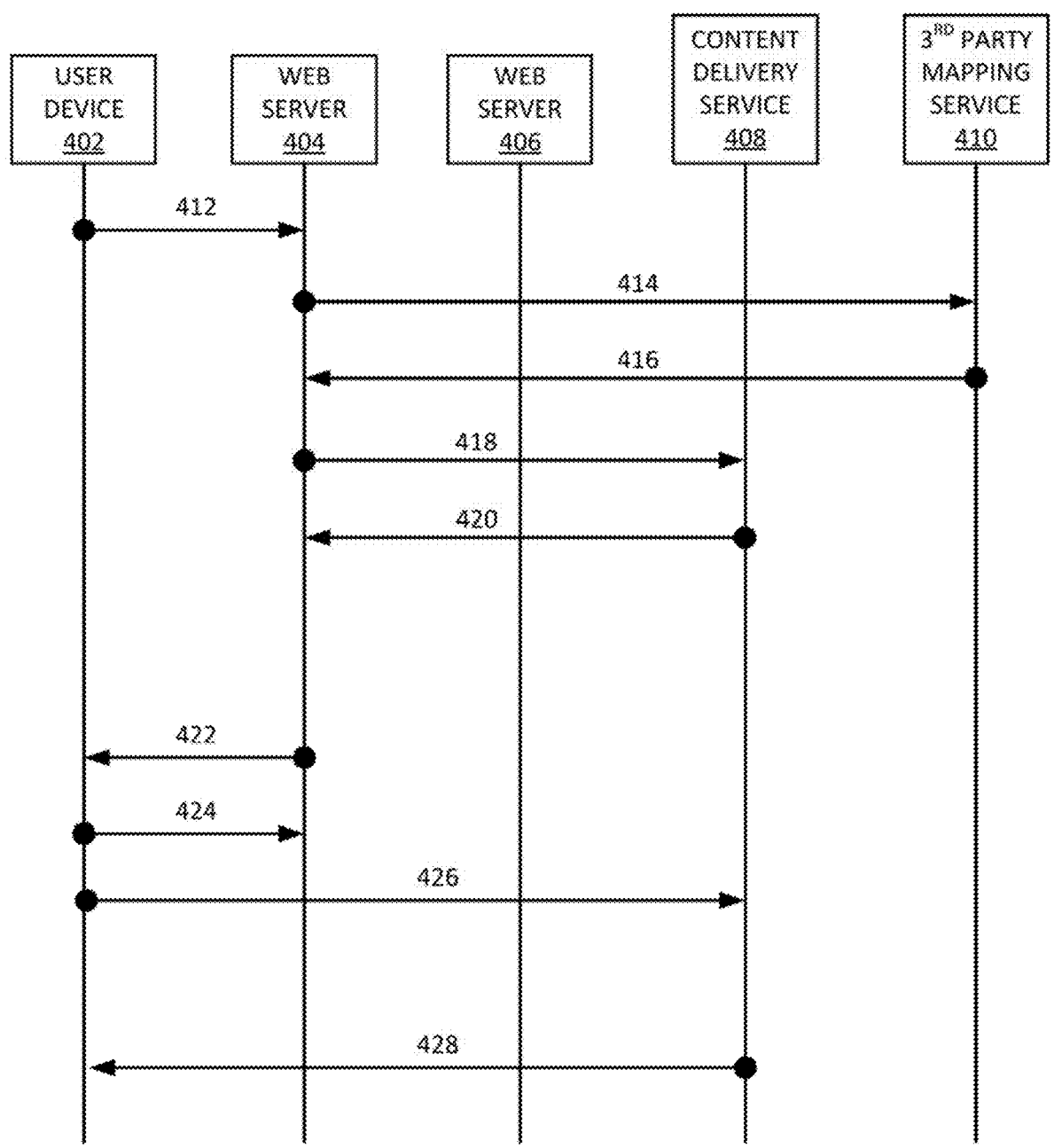
FIG. 4A depicts a flowchart of retrieval of user generated content from one web server according to some embodiments.

FIG. 4A depicts a flowchart 400 of retrieval of user generated content from one web server according to some embodiments. It will be appreciated that that user device 403 may be user system 102-1 of FIG. 1. Similarly the web server 404 may be a domain system 108-1 and web server 406 may be domain system 108-2. The content delivery system 408 may be content delivery system 106.

In step 412, a real estate agent utilizing user device 402, navigates to web server 404 using a uniform resource location (URL). In one example, the web server 404 is controlled, operated, and/or owned by Century 21. In some embodiments, web server 404 may provide a wide variety of different web pages, web sites and/or applications. In other embodiments, step 412 may include user device 402 inputting user identification information, such as login and password, or one or more search criteria to provide to web server 404. The login and password may be associated with the user of user device 402, the user device 402, the web server 404, a group associated with the user device 402, and/or the like.

In step 414, web server 404 requests a map from a third party mapping service, such as Google® maps, Mapquest®, Yahoo!® maps or the like, and the requested map may be sent to web server 404 in step 416. In some embodiments, the requested map may be provided to the user device 402 for rendering. In some embodiments, the map request includes location information including the location or area that the map may depict.

In step 418, the web server 404 provides a request for overlay information from the content delivery system 408. In some embodiments, the web server 404 may provide a domain identifier and location information. The domain identifier may identify the web server 404, a web page of the web server 404, an operator of the web server 404, or an owner of the web server 404. The location information may identify the same or similar location or area provided in the map request.

In various embodiments, the web server 404 may provide a login and/or password to the content delivery system 408. In one example, the authentication module 204 of the content delivery system 408 may authenticate the login and/or password prior to the content management module 206 providing the overlay information (e.g., the overlay information being provided by the content delivery system 106 being based in part on the location information provided to the location module 208. The overlay information may be provided to the web server 404 to provide to the user device 402 or directly to the user device 402. In step 420, the content delivery system 408 may provide the requested overlay information.

In some embodiments, the web server 404 may request the information to content delivery system 408 without having the user enter this information. In one example, the web server 404 may provide log into the content delivery system 408 on the user's behalf. For example, the domain proxy module 214 may use a login and password provided by the web server 404 to authenticate a user and/or web server 404.

It will be appreciated that, in some embodiments, a map is not requested but rather content is requested by web server 404 from the content delivery system 106. In one example, the user may provide search criteria (e.g., location information, creator identification, tags, timestamp, or the like) to the web server 404. The web server 404 may send a search query, based on one or more search criteria, to search module 220 of FIG. 2. The search query may additionally include a domain identifier associated with the web server 404. Based on the domain that the user is currently accessing, or the user group that the user belongs to, the search module 220 may search a particular domain content datastore 302. The search module 220 may filter and organize according to one or more filter criteria, including the categorical identifiers, which may include tags, time stamp of the user generated content, geographical location, user identification and others. Other filtering criteria could include, but are not limited to, name of object or activity, time activity occurred or keywords. In some embodiments, the search module 220 does not filter, but rather only retrieves relevant information from storage based on the query.

The content delivery system 408 may retrieve content from content delivery system datastore 216 of FIG. 2 based on the search query submitted in the previous step. The content delivery system datastore 216 may access the datastore associated with the domain that the user is accessing and retrieve the data entry or data entries that comprises the search results. In some embodiments, the web server 404 may generate a webpage, and a section of the webpage may display the contents of the search result from content delivery system 408.

It will be appreciated that the data rights module 222 may confirm or determine if the user, user device 402, and/or web server 404 have rights to the content prior to providing the content to the user device 402 and/or the web server 404. For example, the data rights module 222 may confirm or authenticate a login or password and then determine data rights of an account associated with the login or password. In some embodiments, the data rights module 222 may confirm or authenticate the domain identifier, or any other criteria to determine data rights.

Figure 6:
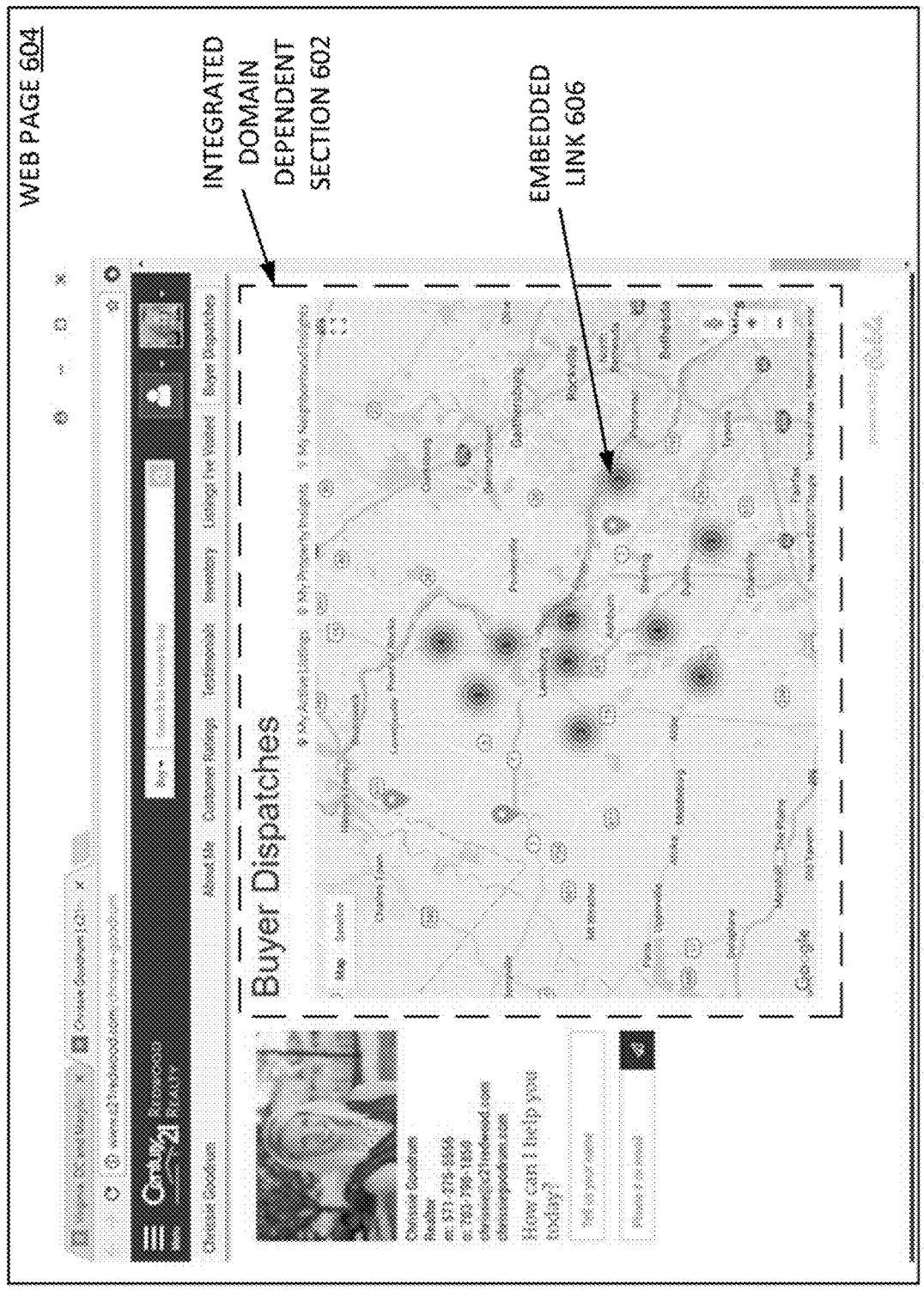
FIG. 6 depicts another example of a domain-dependent section of a web page according to some embodiments.

Subsequently, in step 422, the map and overlay information may be depicted in a web page. FIG. 6 shows an example of a web page 604 with a map and overlay information in some embodiments. In FIG. 6, the integrated domain dependent section 602 includes the map and embedded link 606 includes an element of the overlay information.

Figure 5:
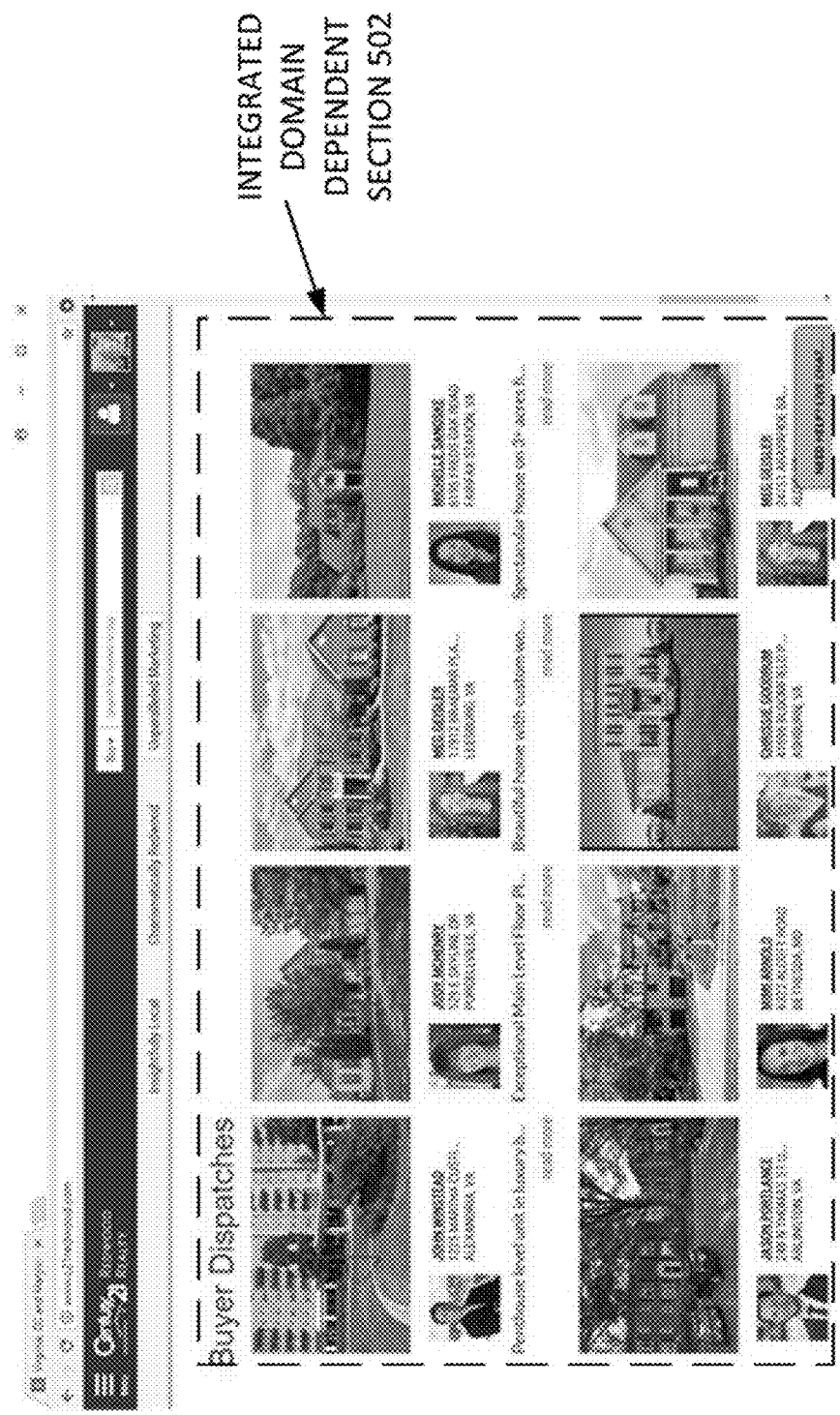
FIG. 5 depicts an example of a domain-dependent section of a web page according to some embodiments.
Figure 7:
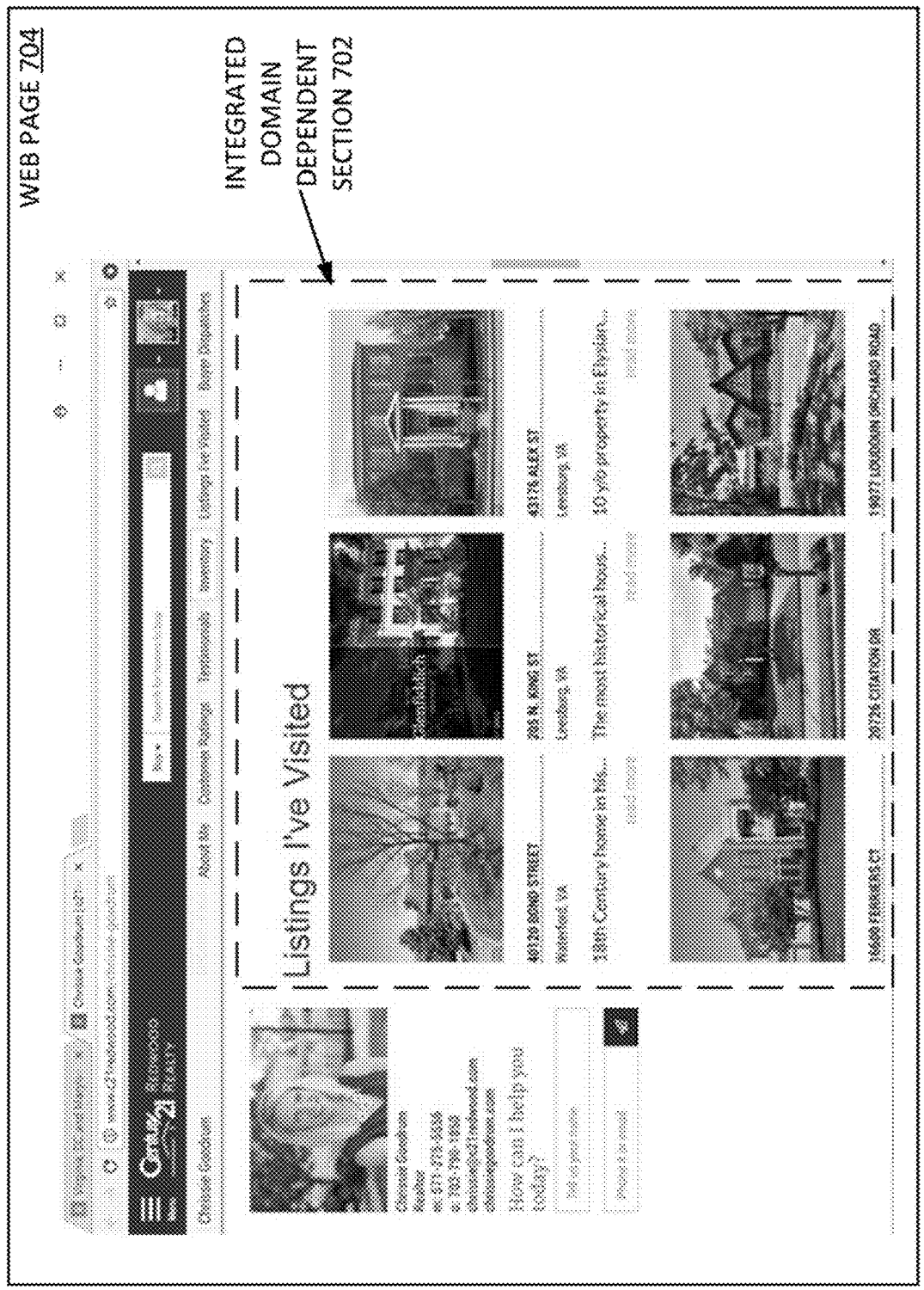
FIG. 7 depicts yet another example of a domain-dependent section of a web page according to some embodiments.

Search results may be integrated into web page 604 such that the entire web page, including the section of the web page which displays the search results (integrated domain dependent section 602), appears to be from the same source. As seen in FIG. 6, integrated domain dependent section 602 displays the search results, which in this example show buyer dispatches of a particular real estate agent in an electronic map. In other examples, the search results may be displayed in a combination of text and picture form, such as integrated domain dependent section 702, as seen in FIG. 7, or integrated domain dependent section 502, as seen in FIG. 5. In other embodiments, search results may be displayed in a combination of one or more of text, photo, audio or video.

In subsequent interactions between user device 402 and web server 404, user device 402 may click on an embedded code (e.g., link) within integrated domain dependent section (e.g., integrated domain dependent section 602 of FIG. 6) and generate a content interaction request.

In step 424, user device 402 may generate a content interaction request user device 402 when user device 402 interacts with integrated domain dependent section 602. In one example, clicking on embedded link 606 on the displayed map in integrated domain dependent section 602, the embedded link is activated. In step 426, the embedded link may provide a request for content from content delivery system 408 while the rest of the content of the web page is provided by the owner or operator of the web page. When user device 402 clicks on one of these embedded links a more detailed view of real estate listing in a particular area can be obtained, as seen in integrated domain dependent section 702 of FIG. 7. The content interaction request may include, for example a domain identification associated with the web site, web page, owner, and/or operator.

The data interaction module 218 may receive the request for content (e.g., an interaction request) that includes an element identifier associated with the active link, domain identifier, and/or other information. In some embodiments, the data rights module 222 may confirm that the requesting user device 402 and/or web server 4094 have sufficient rights to access and receive the requested content (e.g., based on the domain identifier, search criteria, login, and/or password).

In step 428, the content delivery system 408 may retrieve content based on the domain identifier and provide content back to the requesting web page for display as a part of the web page. For example, display components of integrated domain dependent section 602 and 702, such as font style, font color, font size, graphic color, data arrangement, data placement, etc, both conform with the rest of web page 604 and 704 respectively, so that integrated domain dependent section 602 and 702 displays as part of their respective web page. A user accessing similar information on another web server, such as Remax, may submit a search query similar to the search query sent to Remax's web server will result in an integrated domain dependent section which would conform with the display components of the Remax web server.

In some embodiments, the data interaction module 218 and/or the search module 220 may receive the content interaction request. The data interaction module 218 and/or the search module 220 may retrieve the content or actions from the domain content datastore 302 which stores the information associated with the content interaction request.

Figure 8:
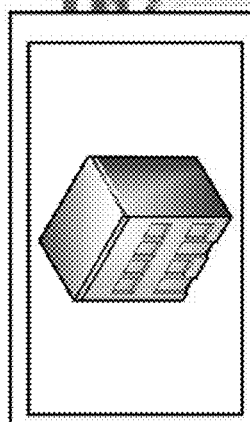
FIG. 8 depicts the results of a content interaction request according to some embodiments.

In various embodiments, using the categorical information from the content request (e.g., search criteria), the content delivery system 408 may request additional access to the location of the one or more objects or activities associated with the particular access data entry, from third party mapping service 410. Content and additional map information (or a different map) may be sent to the user device 402. FIG. 8 depicts an interface 802 of content displayed subsequent to a user interacting with an element of the overlay.

Figure 4B:
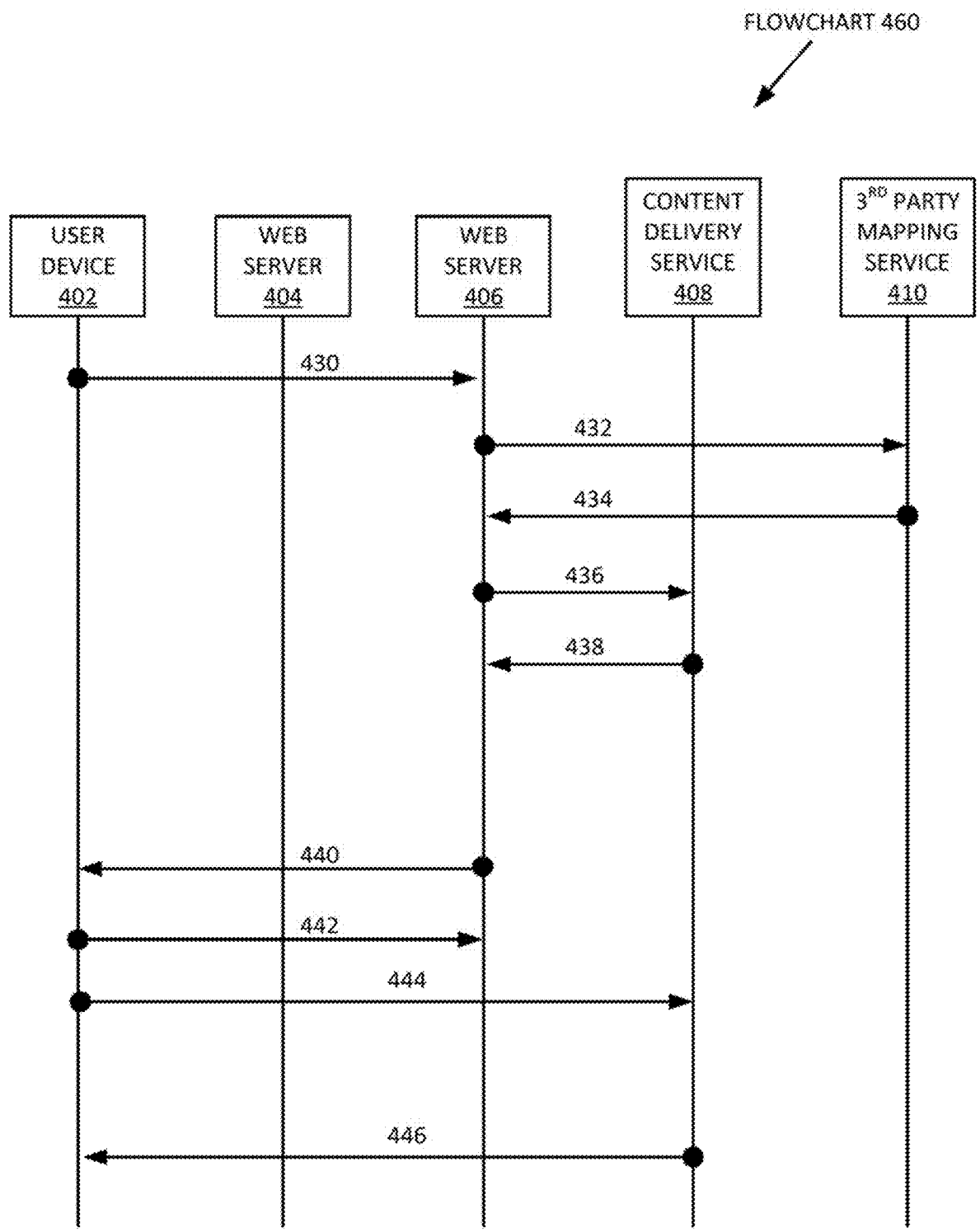
FIG. 4B depicts a flowchart of retrieval of user generated content from another web server according to some embodiments.

FIG. 4B depicts a flowchart of retrieval of user generated content from another web server 406 according to some embodiments. Flowchart 460 is similar to flowchart 400, except in this embodiment, the same user device 402 may access a different web page on web server 406 and retrieve different content from the same content delivery system 408. Steps 430 to 446 are similar to steps 412 to 428 of flowchart 400.

In step 430, user device 402, for example a real estate agent, is attempting to access the uniform resource location (URL) of web server 406, such as a travel review website such as TripAdvisor®.

In step 430, user device 402 navigates to web server 406 using a uniform resource location (URL). In one example, the web server 404 is controlled, operated, and/or owned by TripAdvisor®. In some embodiments, web server 404 may provide a wide variety of different web pages, web sites and/or applications. In other embodiments, step 412 may include user device 402 inputting user identification information, such as login and password, or one or more search criteria to provide to web server 404. The login and password may be associated with the user of user device 402, the user device 402, the web server 404, a group associated with the user device 402, and/or the like.

In step 432, web server 4064 requests a map from a third party mapping service, such as Google® maps, Mapquest®, Yahoo!® maps or the like, and the requested map may be sent to web server 406 in step 434. In some embodiments, the requested map may be provided to the user device 402 for rendering. In some embodiments, the map request includes location information including the location or area that the map may depict. The map, in this case, may include places of interest (e.g., hotels, airports, landmarks, attractions, and the like).

In step 4436, the web server 406 provides a request for overlay information from the content delivery system 408. In some embodiments, the web server 406 may provide a domain identifier and location information. The domain identifier may identify the web server 406, a web page of the web server 406, an operator of the web server 406, or an owner of the web server 406. The location information may identify the same or similar location or area provided in the map request.

In various embodiments, the web server 406 may provide a login and/or password to the content delivery system 408. In one example, the authentication module 204 of the content delivery system 408 may authenticate the login and/or password prior to the content management module 206 providing the overlay information (e.g., the overlay information being provided by the content delivery system 106 being based in part on the location information provided to the location module 208. The overlay information may be provided to the web server 404 to provide to the user device 402 or directly to the user device 402. In step 438, the content delivery system 408 may provide the requested overlay information.

In some embodiments, the web server 406 may request the information to content delivery system 408 without having the user enter this information. In one example, the web server 406 may provide log into the content delivery system 408 on the user's behalf. For example, the domain proxy module 214 may use a login and password provided by the web server 404 to authenticate a user and/or web server 404.

It will be appreciated that, in some embodiments, a map is not requested but rather content is requested by web server 406 from the content delivery system 106. In one example, the user may provide search criteria (e.g., location information, creator identification, tags, timestamp, or the like) to the web server 406. The web server 406 may send a search query, based on one or more search criteria, to search module 220 of FIG. 2. The search query may additionally include a domain identifier associated with the web server 406. Based on the domain that the user is currently accessing, or the user group that the user belongs to, the search module 220 may search a particular domain content datastore 302. The search module 220 may filter and organize according to one or more filter criteria, including the categorical identifiers, which may include tags, time stamp of the user generated content, geographical location, user identification and others. Other filtering criteria could include, but are not limited to, name of object or activity, time activity occurred or keywords. In some embodiments, the search module 220 does not filter, but rather only retrieves relevant information from storage based on the query.

The content delivery system 408 may retrieve content from content delivery system datastore 216 of FIG. 2 based on the search query submitted in the previous step. For example, a traveler interested in viewing all hotels with vacancies closest to the Golden Gate Bridge may have different search criteria from someone looking for tour groups suitable for children in Maui. The content delivery system datastore 216 may access the datastore associated with the domain that the user is accessing and retrieve the data entry or data entries that comprises the search results. In some embodiments, the web server 404 may generate a webpage, and a section of the webpage may display the contents of the search result from content delivery system 408.

It will be appreciated that the data rights module 222 may confirm or determine if the user, user device 402, and/or web server 406 have rights to the content prior to providing the content to the user device 402 and/or the web server 406. For example, the data rights module 222 may confirm or authenticate a login or password and then determine data rights of an account associated with the login or password. In some embodiments, the data rights module 222 may confirm or authenticate the domain identifier, or any other criteria to determine data rights.

Subsequently, in step 440, the map and overlay information may be depicted in a web page. As discussed herein, search results may be integrated into web page of web server 406 such that the entire web page, including the section of the web page which displays the search results (integrated domain dependent section 602), appears to be from the same source. The integrated domain dependent section may display the search results.

In subsequent interactions between user device 402 and web server 406, user device 402 may click on an embedded code (e.g., link) within integrated domain dependent section (e.g., integrated domain dependent section 602 of FIG. 6) and generate a content interaction request.

In step 444, user device 402 may generate a content interaction request user device 402 when user device 402 interacts with integrated domain dependent section. In one example, clicking on embedded link on the displayed map in integrated domain dependent section, the embedded link is activated. In step 444, the embedded link may provide a request for content from content delivery system 408 while the rest of the content of the web page is provided by the owner or operator of the web page. When user device 402 clicks on one of these embedded links a more detailed view of a hotel or location of interest in a particular area can be obtained. The content interaction request may include, for example a domain identification associated with the web site, web page, owner, and/or operator.

The data interaction module 218 may receive the request for content (e.g., an interaction request) that includes an element identifier associated with the active link, domain identifier, and/or other information. In some embodiments, the data rights module 222 may confirm that the requesting user device 402 and/or web server 406 have sufficient rights to access and receive the requested content (e.g., based on the domain identifier, search criteria, login, and/or password).

In step 446, the content delivery system 408 may retrieve content based on the domain identifier and provide content back to the requesting web page for display as a part of the web page.

In some embodiments, the data interaction module 218 and/or the search module 220 may receive the content interaction request. The data interaction module 218 and/or the search module 220 may retrieve the content or actions from the domain content datastore 302 which stores the information associated with the content interaction request.

In various embodiments, using the categorical information from the content request (e.g., search criteria), the content delivery system 408 may request additional access to the location of the one or more objects or activities associated with the particular access data entry, from third party mapping service 410. Content and additional map information (or a different map) may be sent to the user device 402.

A user accessing similar information on another web server, such as Travago®, submit a similar search query similar to Travago®'s web server in step 472, and generate search result in an integrated domain dependent section which would conform with the display components of the Travago® web server.

In the example flowchart seen in FIG. 4B content display system 408 may receive the content interaction request, access data entry 304 of domain content datastore 302 which stores the information associated with the content interaction request. Using the categorical information from that particular access data entry, content delivery system 408 may request access to the location of the one or more objects or activities associated with the particular access data entry, from third party mapping service 410. The map may be sent from third party mapping service 410 and display the requested user generated content overlaid on an electronic map.

Web servers 404 and 406 direct users to different web pages, web sites and/or applications, both web servers retrieve their content from the same content delivery system 408. Content delivery system 408 may provide different content to a wide variety of web pages, web sites and/or applications thereby enabling different web pages, web sites and/or applications to rely on centralized content provided by content delivery system 408 without recreating the content and/or embedded code at each web page, web site and/or application.

In various embodiments, the content delivery system 106 may enable one or more users to comment on another's review or insight, rate a review or insight, share another's review or insight, or follow the author's other review or insights. In some embodiments, a user who uploads content may provide a comment indicator that enables one or more others capable of receiving the user's uploaded content to add review, rate the user's content, share the user's content, or follow the author. In this example, the content delivery system 106 may require the commenting user to register and/or log into the content delivery system 106 (either directly or through a web server) to confirm the other user as well as determine the data rights of the other user. If the uploading user approved that user individually to add comments, ratings, or the like, then the other user may be authorized to upload new content (e.g., the comment or rating of the other user's content). Similarly, the other user may enable others to comment or rate their own comments or ratings.

Figure 9:
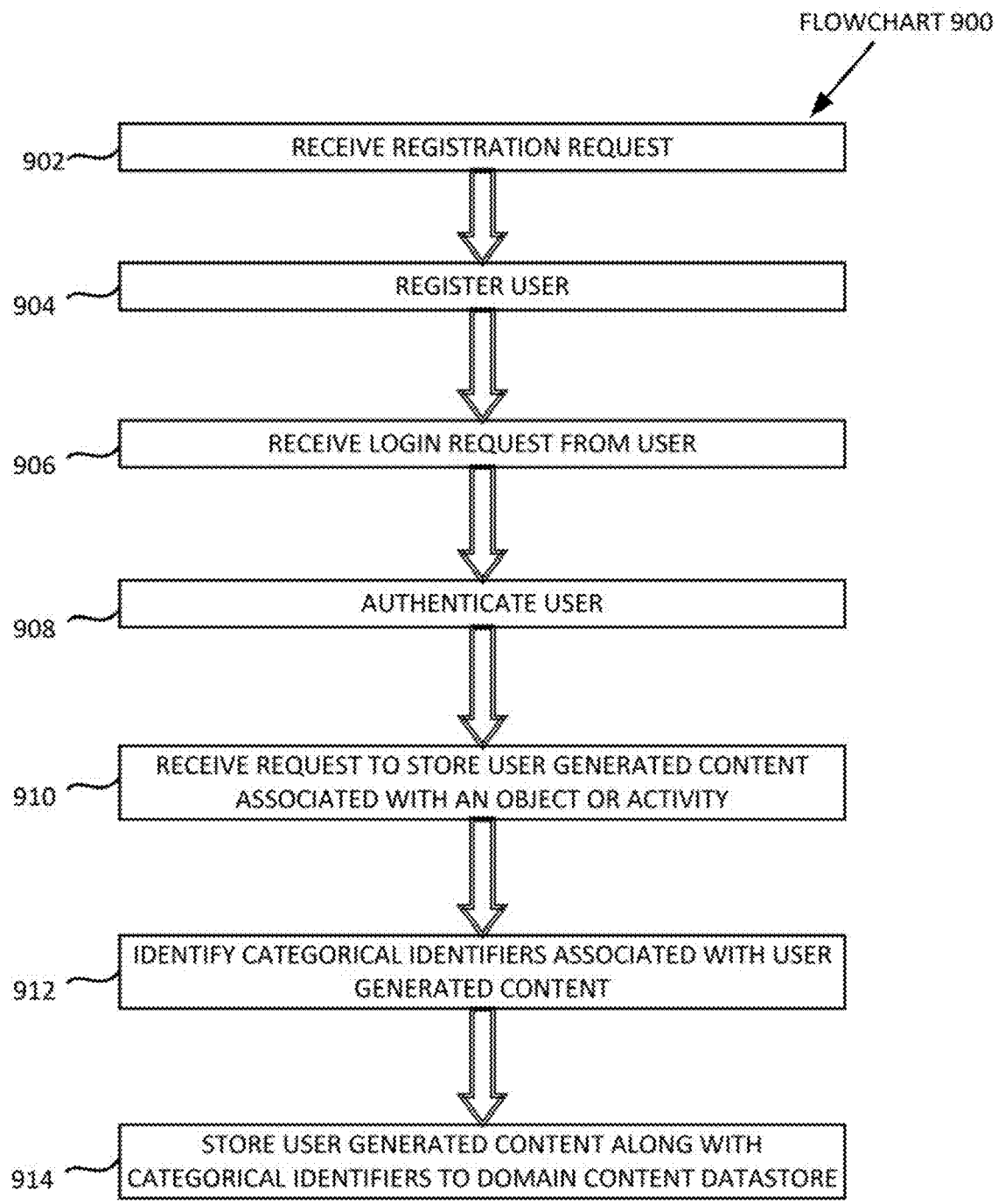
FIG. 9 depicts a flowchart of the process of registering a user and storing user generated content.

FIG. 9 depicts flowchart 900 of the process of registering a user and storing user generated content. In step 902, registration module 202 of FIG. 2 may receive a registration request. A registration request of a new user may include identification information, or login, such as email address, password, phone number, demographic information and the like. In some embodiments. The registration of a new user group may include account information for users who belong to the user group and the level of permission given to each user. The password may be used to authorize the user or group, while the email address may be used as a means of retrieving a forgotten password, or to update users of any changes to their user or group account.

In step 904, the registration request of the new user is accepted by registration module 202. The content delivery system 106 may create an account for the user and include the login, password, identification information or any other kind of information.

In step 906, a login request from a registered user is received by authentication module 204, the login request may include an email address and password.

In step 908 authentication module 204 authenticate the user to access or store particular content by comparing the user's login with a database of registered users for that domain. In other embodiments, domain proxy module 214, may obtain a user's login and password information through a different domain to authenticate the user.

In step 910, a request is received by content delivery system datastore 216 to store user generated content associated with an object or activity. Content delivery system datastore 216 may access a datastore associated with the domain that the user is currently accessing and store the user generated content to that particular domain content datastore. In some embodiments, in addition to the user generated content, content delivery system datastore 216 may also store view/update permission.

In step 912, the content delivery system 106 receives categorical identifiers associated with the object or activity of interest. Categorical identifiers may include domain identification, user identification, geographical location of object or activity associated with the user generated content, time stamp, semantic tags and others.

In step 914, the user generated content and categorical identifiers may be stored in data entry 304. The user's account may also be updated to include an indication of uploaded content.

It will be appreciated that the user may upload any kind of content (e.g., any media) associated with any kind of categories (e.g., any tags). A user may upload personal photos and insights for private reasons or to share with a subset of friends. The same user may upload reviews of landmarks, restaurants, and stores and include tags and data rights such that the information is available over certain web servers (e.g., using one or more specific domains). Further, the user may identify and include insights on rare cars, birds, wildlife, or any other information which may be shared over one or more other specific domains, users, or the like. As such, the content delivery system 106 may include a centralized store of content uploaded by any number of users and shared with different web sites, web pages, application and interfaces in a manner controllable by the user.

It will also be appreciated that, in some embodiments, a user may only store or upload content if they register first and the content is associated with the user.

Figure 10A:
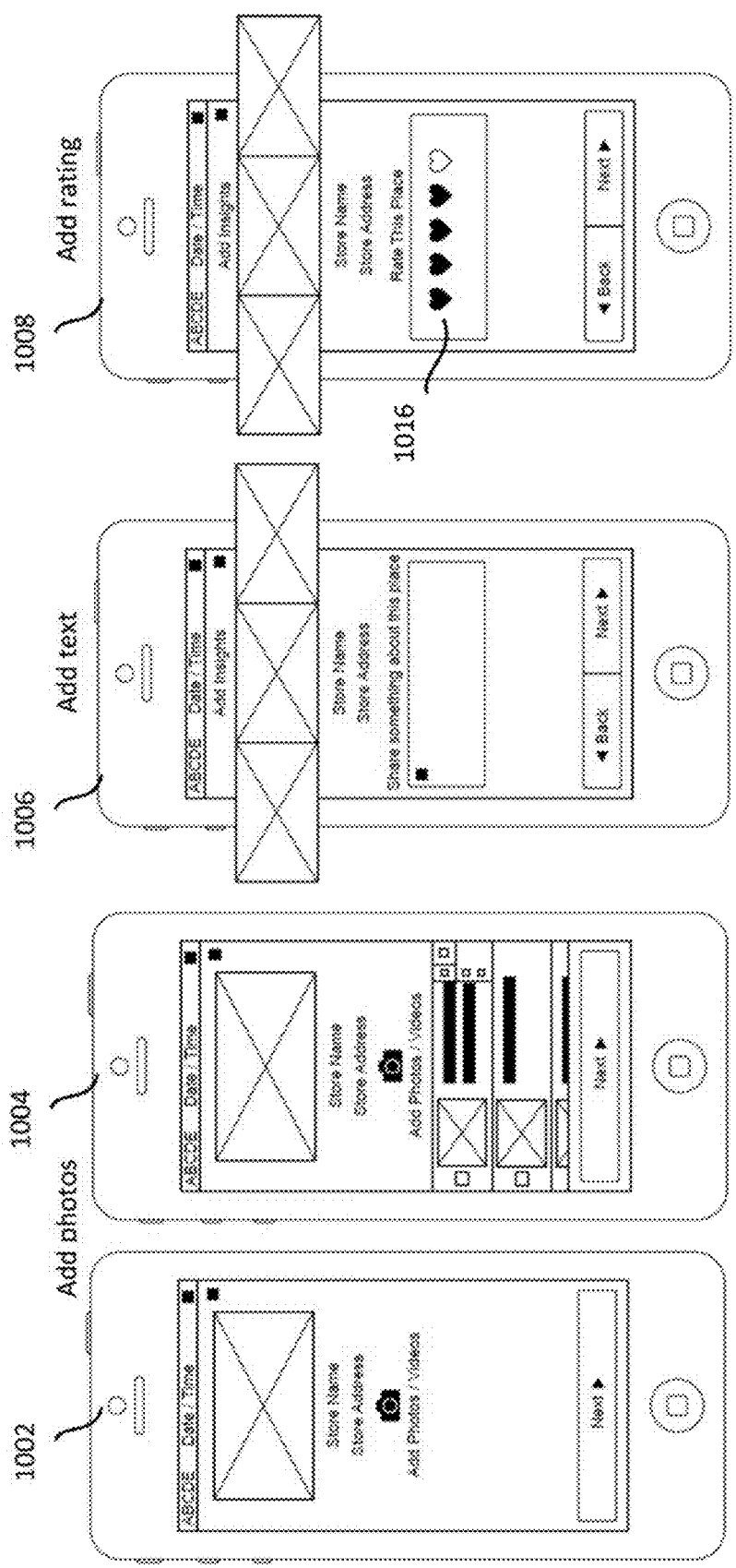
FIG. 10a-10b include example application interfaces for a user to store user generated content on a mobile device.
Figure 10B:
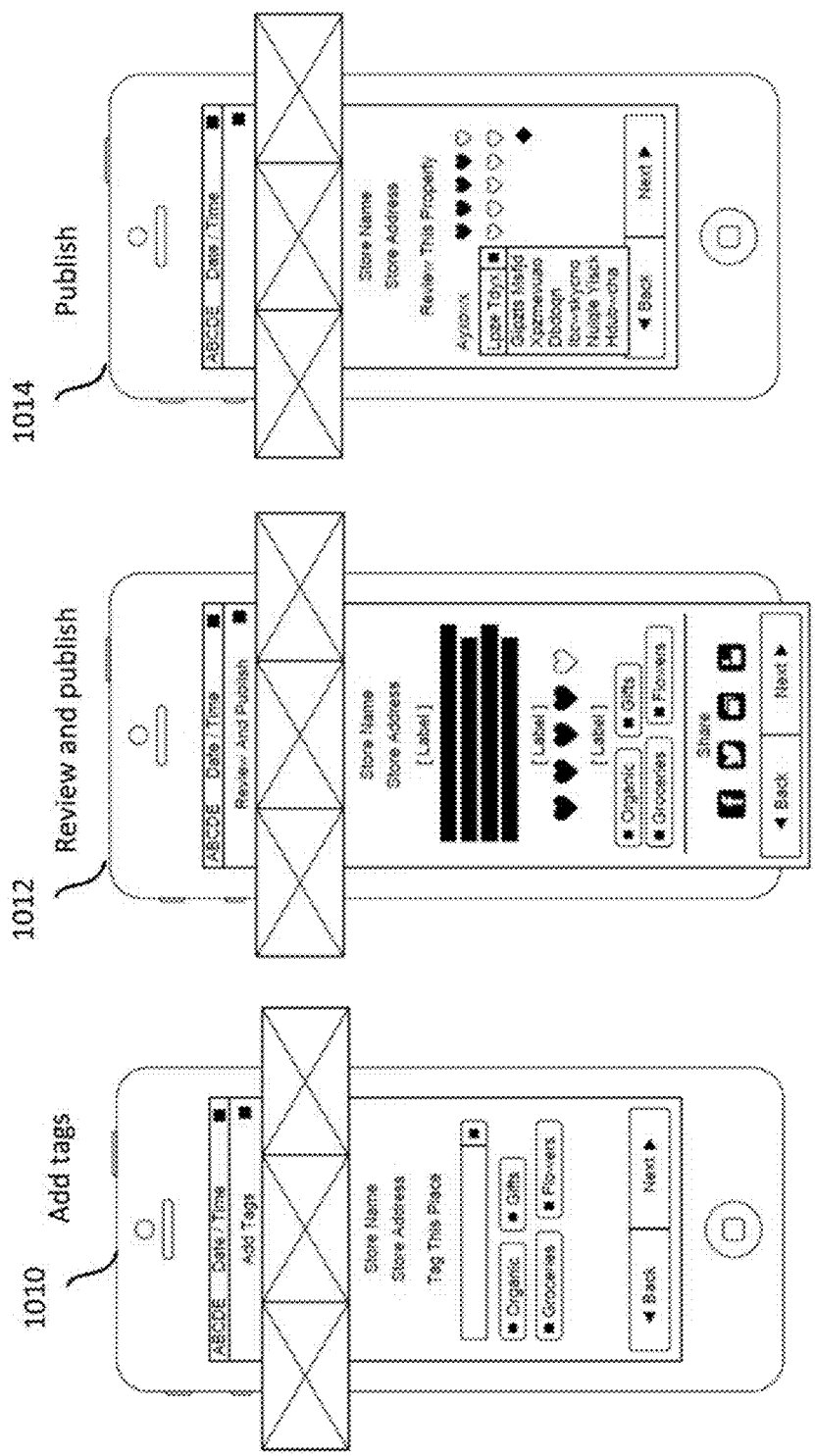

FIG. 10*a*-10*b* depict application interfaces 1002-1014 to enable users to upload content to the content delivery system 106. Although application interfaces 1002-1014 are discussed herein as being created by an application on a mobile device, it will be appreciated that the interfaces may be created by a web page or series of web pages. As the user interacts with the application interface, the next application interface may be displayed.

In various embodiments, a user may direct the application to identify an of an object or activity (e.g., a facility at a location). The application interface 1002 may include a request to add a picture of video of an object or activity. Application interface 1004 depicts a series of images and text that may be added. Application interface 1006 enables insights (e.g., text) to be added. The insights may include information regarding the object or activity, such as identification, geographical information, or the like.

Application interface 1008 may be generated including an opportunity for the user to input in a five heart rating system, where five heart can be interpreted as a great like for the activity or object, and one heart can be interpreted as a dislike for the activity or object. Similarly, in other embodiments, user rating 1016 can be in a star system or any system including any number of objects (e.g., stars, thumbs up, hearts, or the like).

Interface 1010 may enable the user to add tags associated with the activity or object. A tag may be a categorical identifier (e.g., an identifier that identifies a category associated with the activity or object). These tags can be one of the search criteria associated with the search query received by search module 220 of FIG. 2, or it can be used to classify or organize the user generated content. Application interface 1012 may allow the user to review and publish the content, ratings, tags, text, and the like. Changes to one or all of the user generated content may be performed before it is published. In various embodiments, the application uploads the content, text, address, score, tags, creator identifier (e.g., identifying the creator), domains associated with the creator, timestamp, location information associated with the activity or object, and/or any other information. The content delivery system 106 may receive the information and content, optionally confirm that the creator is registered, and store the content. The content delivery system 106 may associate any or all information with the content.

The application interface 1014 depicts the published user generated content. The published user generated content can be shared across social networks.

In various embodiments, embedded code may be utilized to assist any number of websites and web pages to utilize content from third party sites and control actions in a manner that enables the functionality and content to be associated with the domain of the particular web site or web page. In one example, a user (e.g., a real estate agent) may create reviews of properties for a sale that they have visited. The application interface (or a website) may include tools that allow the real estate agent to answer multiple questions and create their review. The review may include one or more of text, photos, video, and/or audio.

In various embodiments, the content delivery system 106 may collect a set of reviews created by that real estate agent. Reviews created by the real estate agents may also be reviewed and rated by consumers and other agents; this is additional crowd-sourced data that may be collected and distributed with embedded code.

In some embodiments, the content delivery system 106 may import property listing data from MLS systems and brokerages. The data may be provided in a variety of formats (including but not limited to XML, text, Excel file, csv, tsv, or RETS server). The importation of data may occur periodically, manually, or on a scheduled basis (e.g., nightly). The imported data may be stored in any number of places including, for example, the content delivery system 106. This data (e.g., listings) may also include internal ids and data from the data provider.

In various embodiments, code may be provided to third party websites mobile applications, and the like for embedding (i.e., embedded code) in web pages and/or application interfaces. The embedded code may, for example, provide information on the collected crowd-sourced user generated content (e.g., real estate information uploaded by the real estate agent).

In one example, the embedded code may generate a section on the home page of a brokerage site and may display the most recent activity of agents at that brokerage. The embedded code may also create one or more links in or associated with the section of the web page to link properties being displayed, and to the agent who created the review.

In various embodiments, the embedded code may retrieve (or may generate an map agent to retrieve) an interactive map of any number of the reviews (e.g., all) that the agent had created. Each review may be a pin on the map (to show where the review occurred).

An end user (e.g., a viewer or customers) may hover a mouse over a pin in the map to get more information (such as summary, photos, video, or the like). In various embodiments, the embedded code includes functionality to retrieve the information from the web site or the content delivery system 106 based on the action.

If the end user clicked on a pin, the embedded code may navigate the user to that property listing page on the third party site. The property listing page may include other embedded code that displays a list of the reviews for that property.

It will be appreciated that embedded code may be added or may generate functionality to an existing website or application via javascript and HTML, for example. Deeper levels of integration may not be required.

It will be appreciated that the embedded code may be customized so the sections of the web pages generated by the embedded code may seamlessly blend in the rest of the web page or application interface.

Items that may be customized in one or more embodiments may include but are not limited to:
Font style
Font color
Font size
Graphic color
Data arrangement
Data placement
Number of items to be displayed
Which data elements should be displayed In some embodiments, embedded code may generate functionality to assist in securing information such that the content may only be used by a third party site. For example, the embedded code may generate a security code (e.g., encryption key, password, or the like) to provide to the content delivery system 106. The content delivery system 106 may confirm or authenticate the security code before providing content. In another example, prior to navigating the user to another website, the web site to be navigated to may confirm and/or authenticate the security code.

In various embodiments, when a section is generated by embedded code on a web page, the embedded code may provide web page section information to the content delivery system 106. The web page section information may include, but is not limited to, a time stamp when the section was generated, IP address/location that the section was viewed, browser information, user information if available, and the like.

In some embodiments, every time an element in a section generated by the embedded code is clicked on, that information may also be logged into the content delivery system 106. The content delivery system 106 may use any, some, or all information to provide reports to the third party and others on individual embedded code behavior or aggregate behavior.

Embedded code on a third party site may or may not be visible to web crawlers (such as the Google Bot), and may contribute to and enhance a third parties web site ranking and SEO visibility.

In some embodiments, embedded code may include actions for any number links, images, or other elements associated with the section generated by the embedded code. In various embodiments, the embedded code may request actions from the content delivery system 106 for interactions with any number of links, images, or other elements associated with the section.

When a user clicks on a link, image, or other element that has a URL associated with it, the user may be navigated using the URL to another page on the third party site. These URLs may be specific to the third party site. In one example, the URLs may involve using identifiers or other information that is specific to that site, and not otherwise known except via the use of the data feed. The URL addresses may also have a format and naming that is specific to the third party site. The information may be made available to the content delivery system 106 or a system that creates the embedded code (e.g., in some embodiments, the content delivery system 106 creates the embedded code) during the customization process so that URLs can be constructed.

In various embodiments, the content delivery system 106 may utilize third party internal data to select the appropriate crowd-sourced data (e.g., specific to the specific property for sale or real estate agent) from its database, and make it available in the embedded code.

The customization and data integration enabled by the embedded code may allow third parties to seamlessly embed services and technology (e.g., content and/or actions) from the content delivery system 106 into their websites and applications.

It will be appreciated other entities such as Yelp and EventBrite may provide code that can be embedded on third party sites, however this code functions like banner ads; they display information that is provided by the code owner (e.g., by Yelp), and do not require any data integration. Clicking on the display generated by this particular code (e.g., the banner ad) takes the user to the code owner's site (i.e. the user is taken off of the third party site to Yelp). The code does not generate a section with a customized to look and behave as part of the third party site.

It will be appreciated that embedded code may be utilized in any domain, category, or the like and is not restricted to the real estate domain. Any or all may be used in any domain where crowd-sourced data is collected and distributed to third parties. Potential uses for example, news sharing. For example, the content delivery system 106 may collect user generated content on current events (including text, photos, video, audio). The content delivery system 106 may receive any number of data feeds from a news service (such as CNN) that contains their list of news stories, along with their internal ID and URL structure. The content delivery system 106 may then provide this information (in a format customized to the third parties need) that could be embedded on the third party site using embedded code (e.g., the embedded code generating an integrated display within a web page such that it appears to the user the information is seamlessly provided in the web page.

This information could have links to related stories, articles by that author, or anything else. The links may navigate the user to other pages on the third party site (which could also contain information from the content delivery system 106).

Figure 11:
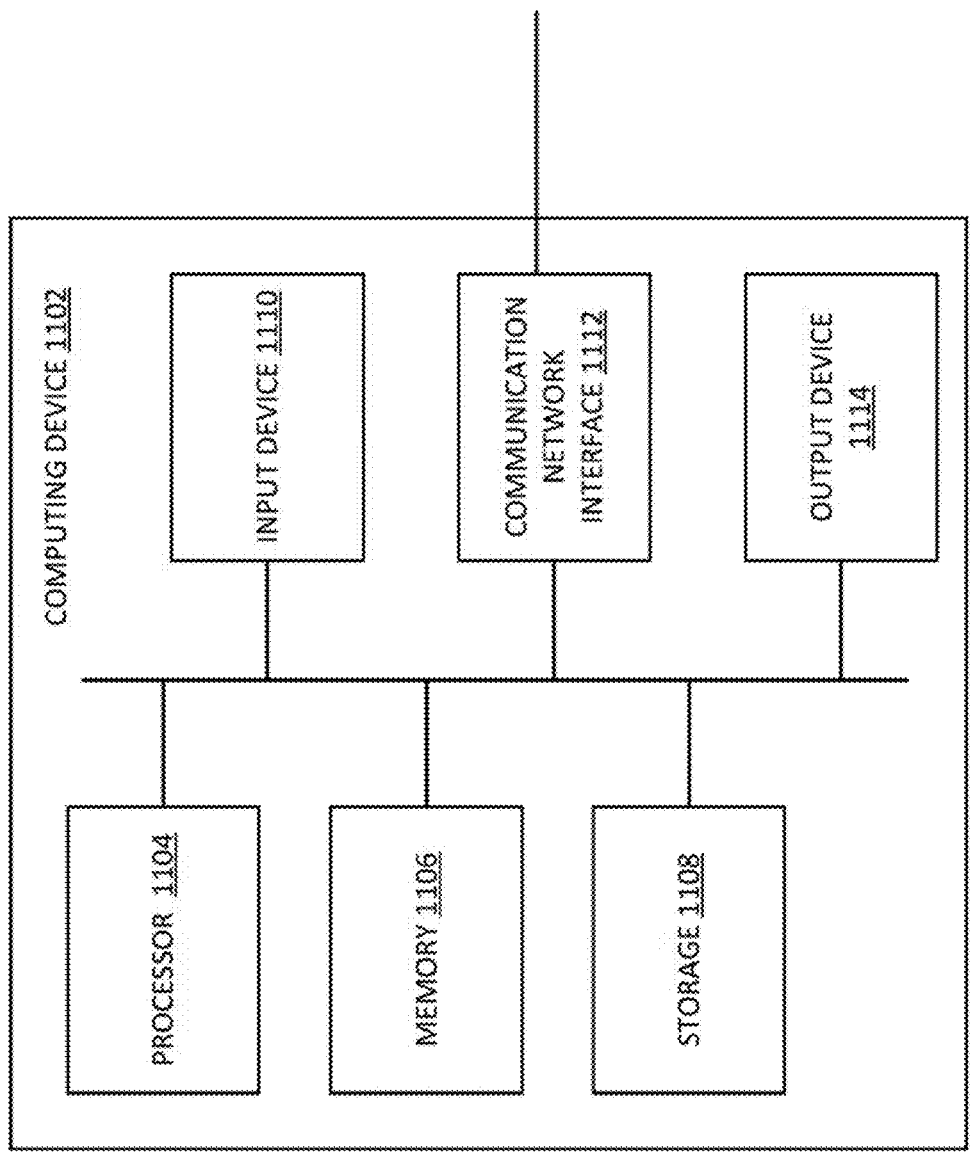
FIG. 11 depicts a block diagram of an example computing device according to some embodiments.

FIG. 11 depicts a block diagram of an example computing device 1102 according to some embodiments. Any user system 102, content delivery system 106 and domain system 108 may comprise an instance of computing device 1102. Computing device 1102 comprises a processor 1104, a memory 1106, a storage 1108, an input device 1110, a communication network interface 1112 and an output device 1114. Processor 1104 is configured to execute executable instructions (e.g., programs). In some embodiments, the processor 1804 comprises circuitry or any processor capable of processing the executable instructions.

Memory 1106 stores data. Some examples of memory 1106 include storage devices, such as RAM, ROMA, RAM cache, virtual memory, etc. In various embodiments, working data is stored within memory 1106. The data within memory 1106 may be cleared or ultimately transferred to storage 1108.

Storage 1108 includes any storage configured to retrieve and store data. Some examples of storage 1108 includes flash drives, hard drives, optical drives, and/or magnetic tape. Each of memory system 1106 and storage system 1108 comprises a computer-readable medium, which stores instructions or programs executable by processor 1104.

Input device 1110 is any device that inputs data (e.g., mouse, keyboard, stylus). Output device 1114 outputs data (e.g., speaker, display, virtual reality headset). It will be appreciated that storage 1108, input device 1110 and output device 1114 may be optional. For example, routers/switchers may comprise processor 1104 and memory 1106 as well as a device to receive and output data (e.g., communication network interface 1112 and/or output device 1114).

Communication network interface 1112 may be coupled to a network (e.g. communication network 104) via communication network interface 1112. Communication network interface 1112 may support communication over an Ethernet connection, a serial connection, a parallel connection, and/or an ATA connection. Communication network interface 1112 may also support wireless communication (e.g., 1102.11 a/b/gin, WiMax, LTE, WiFi). It will be apparent that communication network interface 1112 may support many wired and wireless standards.

The invention claimed is:

1. A method comprising:
registering, by a content delivery system, accounts for a plurality of users;
authenticating, by the content delivery system, one or more of the plurality of users;
receiving a first request to store a first user generated content by a first user of the plurality of users, the first user generated content being associated with at least the first user, the first request to store the first user generated content including an uploading user identifier, one or more first categorical identifiers associated with the first user generated content, and a first domain identifier, the first domain identifier being associated with a first web server;
associating the first user generated content with an account of the first user, the uploading user identifier, the one or more first categorical identifiers, and the first domain identifier;
storing, by the content delivery system, the first user generated content and associations;
receiving a second request to store a second user generated content by the first user, the second user generated content being associated with at least one first user, the second request to store the second user generated content including an uploading user identifier, one or more second categorical identifiers associated with the second user generated content, and a second domain identifier, the second domain identifier being associated with a second web server;
associating the second user generated content with the uploading user identifier, the one or more second categorical identifiers, and the second domain identifier;
storing, by the content delivery system, the second user generated content and associations;
receiving, from a searching user at a web site associated with a domain, a search request, the search request including a search criteria including at least a third domain identifier, the third domain identifier being associated with the domain;
if the third domain identifier is associated with the first domain identifier, determining all or a portion of the first user generated content to provide to the searching user based on the search criteria, requesting, from a third-party mapping service for a location associated with the first user generated content, and providing all or the portion of the first user generated content to the searching user; and
if the third domain identifier is associated with the second domain identifier, determining all or a portion of the second user generated content to provide to the searching user based on the search criteria, requesting, from the third-party mapping service for a location associated with the second user generated content, and providing all or the portion of the first user generated content to the searching user.

2. The method of claim 1, wherein the first user generated content is associated with an object or activity.

3. The method of claim 2 further comprising:
wherein the first request to store the first user generated content includes a time stamp indicating when the first user generated content was uploaded, the time stamp being associated with the first user generated content, wherein determining all or the portion of the first user generated content to provide to the searching user based on the search criteria includes, at least in part, determining all or the portion of the first user generated content to provide to the searching user based on the search criteria that includes a timestamp search criteria that is compared to the time stamp, wherein the first user generated content is provided to the searching user if the timestamp search criteria is satisfied based on the time stamp associated with the first user generated content.

4. The method of claim 2 further comprising:
wherein the first request to store the first user generated content includes a user identifier indicating the first user who uploaded the first user generated content, wherein determining all or the portion of the first user generated content to provide to the searching user based on the search criteria includes, at least in part, determining all or the portion of the first user generated content to provide to the searching user based on the search criteria that includes a user search criteria that is compared to the user identifier, wherein the first user generated content is provided to the searching user if the user search criteria is satisfied based on the user identifier associated with the first user generated content.

5. The method of claim 2 further comprising:
wherein the first request to store the first user generated content includes a location identifier indicating the location associated with the first user generated content, wherein determining all or the portion of the first user generated content to provide to the searching user based on the search criteria includes, at least in part, determining all or the portion of the first user generated content to provide to the searching user based on the search criteria that includes a location search criteria that is compared to the location identifier, wherein the first user generated content is provided to the searching user if the location search criteria is satisfied based on the location identifier associated with the first user generated content.

6. The method of claim 2 further comprising:
wherein the first request to store the first user generated content includes a tags indicating categorical information associated with the first user generated content, wherein determining all or the portion of the first user generated content to provide to the searching user based on the search criteria includes, at least in part, determining all or the portion of the first user generated content to provide to the searching user based on the search criteria that includes a tag search criteria that is compared to the first one or more categorical identifiers associated with the first user generated content, wherein the first user generated content is provided to the searching user if the tag search criteria is satisfied based on the first one or more categorical identifiers associated with the first user generated content.

7. The method of claim 1, further comprising receiving an overlay request and location information, and providing an overlay based at least in part on the location information in response to the overlay request, the overlay request including at least one element associated with the at least a portion of the first user generated content.

8. The method of claim 7, further comprising receiving an element interaction indicating a user has clicked on the at least one element and providing the at least a portion of the first user generated content.

9. The method of claim 1, wherein the first user generated content is in a form of one or more of text, audio, or video.

10. A non-transitive computer readable medium comprising executable instructions, the executable instructions being executable by a processor for performing a method, the method comprising:
- registering, by a content delivery system, accounts for a plurality of users;
- authenticating, by the content delivery system, one or more of the plurality of users;
- receiving a first request to store a first user generated content by a first user of the plurality of users, the first user generated content being associated with at least the first user, the first request to store the first user generated content including an uploading user identifier, one or more first categorical identifiers associated with the first user generated content, and a first domain identifier, the first domain identifier being associated with a first web server;
- associating the first user generated content with an account of the first user, the uploading user identifier, the one or more first categorical identifiers, and the first domain identifier;
- storing, by the content delivery system, the first user generated content and associations;
- receiving a second request to store a second user generated content by the first user, the second user generated content being associated with at least one first user, the second request to store the second user generated content including an uploading user identifier, one or more second categorical identifiers associated with the second user generated content, and a second domain identifier, the second domain identifier being associated with a second web server;
- associating the second user generated content with the uploading user identifier, the one or more second categorical identifiers, and the second domain identifier;
- storing, by the content delivery system, the second user generated content and associations;
- receiving, from a searching user at a web site associated with a domain, a search request, the search request including a search criteria including at least a third domain identifier, the third domain identifier being associated with the domain;
- if the third domain identifier is associated with the first domain identifier, determining all or a portion of the first user generated content to provide to the searching user based on the search criteria, requesting, from a third-party mapping service for a location associated with the first user generated content, and providing all or the portion of the first user generated content to the searching user; and
- if the third domain identifier is associated with the second domain identifier, determining all or a portion of the second user generated content to provide to the searching user based on the search criteria, requesting, from the third-party mapping service for a location associated with the second user generated content, and providing all or the portion of the first user generated content to the searching user.

11. The non-transitive computer readable medium of claim 10, wherein the first user generated content is associated with an object or activity.

12. The non-transitive computer readable medium of claim 11, the method further comprising:
- wherein the first request to store the first user generated content includes a time stamp indicating when the first user generated content was uploaded, the time stamp being associated with the first user generated content, wherein determining all or the portion of the first user generated content to provide to the searching user based on the search criteria includes, at least in part, determining all or the portion of the first user generated content to provide to the searching user based on the search criteria that includes a timestamp search criteria that is compared to the time stamp, wherein the first user generated content is provided to the searching user if the timestamp search criteria is satisfied based on the time stamp associated with the first user generated content.

13. The non-transitive computer readable medium of claim 11, the method further comprising:
- wherein the first request to store the first user generated content includes a user identifier indicating the first user who uploaded the first user generated content, wherein determining all or the portion of the first user generated content to provide to the searching user based on the search criteria includes, at least in part, determining all or the portion of the first user generated content to provide to the searching user based on the search criteria that includes a user search criteria that is compared to the user identifier, wherein the first user generated content is provided to the searching user if the user search criteria is satisfied based on the user identifier associated with the first user generated content.

14. The non-transitive computer readable medium of claim 11, the method further comprising:
- wherein the first request to store the first user generated content includes a location identifier indicating the location associated with the first user generated content, wherein determining all or the portion of the first user generated content to provide to the searching user based on the search criteria includes, at least in part, determining all or the portion of the first user generated content to provide to the searching user based on the search criteria that includes a location search criteria that is compared to the location identifier, wherein the first user generated content is provided to the searching user if the location search criteria is satisfied based on the location identifier associated with the first user generated content.

15. The non-transitive computer readable medium of claim 11, the method further comprising:
- wherein the first request to store the first user generated content includes a tags indicating categorical information associated with the first user generated content, wherein determining all or the portion of the first user generated content to provide to the searching user based on the search criteria includes, at least in part, determining all or the portion of the first user generated content to provide to the searching user based on the search criteria that includes a tag search criteria that is compared to the one or more first categorical identifiers associated with the first user generated content, wherein the first user generated content is provided to the searching user if the tag search criteria is satisfied based on the one or more first categorical identifiers associated with the first user generated content.

16. The non-transitive computer readable medium of claim 10, the method further comprising receiving an overlay request and location information, and providing an overlay based at least in part on the location information in response to the overlay request, the overlay request including at least one element associated with the at least a portion of the first user generated content.

17. The non-transitive computer readable medium of claim 16, the method further comprising receiving an element interaction indicating a user has clicked on the at least one element and providing the at least a portion of the first user generated content.

18. The non-transitive computer readable medium of claim 10, wherein the first user generated content is in a form of one or more of text, audio, or video.

19. A system comprising:
one or more processors; and
memory, the memory including instructions to configure the one or more processors to:
register, by a content delivery system, accounts for a plurality of users;
authenticate, by the content delivery system, one or more of the plurality of users;
receive a first request to store a first user generated content by a first user of the plurality of users, the first user generated content being associated with at least the first user, the first request to store the first user generated content including an uploading user identifier, one or more first categorical identifiers associated with the first user generated content, and a first domain identifier, the first domain identifier being associated with a first web server;
associate the first user generated content with an account of the first user, the uploading user identifier, the one or more first categorical identifiers, and the first domain identifier;
store, by the content delivery system, the first user generated content and associations;
receive a second request to store a second user generated content by the first user, the second user generated content being associated with at least one first user, the second request to store the second user generated content including an uploading user identifier, one or more second categorical identifiers associated with the second user generated content, and a second domain identifier, the second domain identifier being associated with a second web server;
associate the second user generated content with the uploading user identifier, the one or more second categorical identifiers, and the second domain identifier;
store, by the content delivery system, the second user generated content and associations;
receive, from a searching user at a web site associated with a domain, a search request, the search request including a search criteria including at least a third domain identifier, the third domain identifier being associated with the domain;
if the third domain identifier is associated with the first domain identifier, determine all or a portion of the first user generated content to provide to the searching user based on the search criteria, request, from a third-party mapping service for a location associated with the first user generated content, and provide all or the portion of the first user generated content to the searching user; and
if the third domain identifier is associated with the second domain identifier, determine all or a portion of the second user generated content to provide to the searching user based on the search criteria, request, from the third-party mapping service for a location associated with the second user generated content, and provide all or the portion of the first user generated content to the searching user.

* * * * *